US012466977B2

(12) United States Patent
Webster et al.

(10) Patent No.: US 12,466,977 B2
(45) Date of Patent: Nov. 11, 2025

(54) AMPHIPHILIC SILOXANE POLYURETHANE COATING COMPOSITIONS AND METHODS OF MAKING AND USING THEREOF

(71) Applicant: NDSU RESEARCH FOUNDATION, Fargo, ND (US)

(72) Inventors: Dean C. Webster, Fargo, ND (US); Teluka Galhenage, Chestnut Hill, MA (US); Ryan Burgett, Maple Grove, MN (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 76 days.

(21) Appl. No.: 17/119,334

(22) Filed: Dec. 11, 2020

(65) Prior Publication Data
US 2022/0025209 A1    Jan. 27, 2022

Related U.S. Application Data

(60) Provisional application No. 62/947,173, filed on Dec. 12, 2019.

(51) Int. Cl.
| | | |
|---|---|---|
| *C09D 175/04* | (2006.01) | |
| *C08G 18/10* | (2006.01) | |
| *C08G 18/24* | (2006.01) | |
| *C08G 18/32* | (2006.01) | |
| *C08G 18/48* | (2006.01) | |
| *C08G 18/61* | (2006.01) | |
| *C08G 18/70* | (2006.01) | |
| *C08G 18/77* | (2006.01) | |
| *C08G 18/78* | (2006.01) | |
| *C08G 18/79* | (2006.01) | |
| *C09D 5/16* | (2006.01) | |
| *C09D 7/63* | (2018.01) | |
| *C09D 7/65* | (2018.01) | |
| *C09D 175/08* | (2006.01) | |

(52) U.S. Cl.
CPC .......... *C09D 175/04* (2013.01); *C08G 18/10* (2013.01); *C08G 18/246* (2013.01); *C08G 18/3221* (2013.01); *C08G 18/3271* (2013.01); *C08G 18/4808* (2013.01); *C08G 18/4833* (2013.01); *C08G 18/61* (2013.01); *C08G 18/706* (2013.01); *C08G 18/771* (2013.01); *C08G 18/78* (2013.01); *C08G 18/792* (2013.01); *C09D 5/1675* (2013.01); *C09D 5/1687* (2013.01); *C09D 7/63* (2018.01); *C09D 7/65* (2018.01); *C09D 175/08* (2013.01)

(58) Field of Classification Search
CPC ...... C08G 18/10; C08G 18/61; C08G 18/771; C08G 18/3221; C08G 18/78; C08G 18/3271; C08G 18/4808; C08G 18/4833; C08G 18/706; C08G 18/792; C08G 18/246; C09D 175/04; C09D 175/08; C09D 5/1675; C09D 5/1687; C09D 7/65; C09D 7/63
See application file for complete search history.

(56) References Cited

U.S. PATENT DOCUMENTS

| | | | |
|---|---|---|---|
| 6,774,181 B1 * | 8/2004 | Bechara | C08J 7/0427 |
| | | | 525/185 |
| 7,989,074 B2 | 8/2011 | Webster et al. | |
| 9,169,359 B2 | 10/2015 | Webster et al. | |
| 11,859,099 B2 * | 1/2024 | Webster | C08G 18/246 |
| 2007/0055016 A1 * | 3/2007 | Niesten | C08G 18/706 |
| | | | 525/100 |
| 2012/0142885 A1 * | 6/2012 | Matsuki | C08G 18/4238 |
| | | | 156/331.4 |
| 2012/0264847 A1 | 10/2012 | Thorlaksen et al. | |
| 2014/0011741 A1 * | 1/2014 | Abuchowski | A61K 9/0019 |
| | | | 514/13.5 |
| 2014/0135422 A1 | 5/2014 | Thorlaksen et al. | |
| 2014/0170426 A1 | 6/2014 | Thorlaksen | |

FOREIGN PATENT DOCUMENTS

WO    WO-2016196565 A2 *    12/2016    ........... C08G 18/283

OTHER PUBLICATIONS

Pires et al., "A New Tailor-Made Polyisocyanate for Two-Pack Water-Borne Polyurethane Coatings", Surface Coatings International Part B: Coatings Transactions, vol. 85, Sep. 2002, pp. 185-190.*
National Industrial Chemicals Notification and Assessment Scheme (NICNAS), Full Public Report, File No. PLC/766, Jun. 2008, from https://www.industrialchemicals.gov.au/sites/default/files/PLC766%20Public%20Report%20PDF.pdf.*
Finlay et al., "The Influence of Surface Wettability on the Adhesion Strength of Settled Spores of the Green Alga Enteromorpha and the Diatom Amphora," Integr. Comp. Biol., 2002, 42(6), 1116-1122.
Iguerb et al., "Antifouling Properties of Poly(methyl methacrylate) Films Grafted with Poly(ethylene glycol Monoacrylate Immersed in Seawater," Langmuir, 2008, 24(21), 12272-12281.
Wyszogrodzka et al., "Synthesis and Characterization of Glycerol Dendrons, Self-Assembled Monolayers on Gold: A Detailed Study of Their Protein Resistance," Biomacromolecules, 2009, 10(5), 1043-1054.
Andrade et al., "Surface Characterization of Poly(Hydroxyethyl Methacrylate) and Related Polymers. I. Contact Angle Methods in Water," Journal of Polymer Science: Polymer Symposia, 1979, 66(1), 313-336.

(Continued)

*Primary Examiner* — Patrick D Niland
(74) *Attorney, Agent, or Firm* — RAPHAEL BELLUM PLLC

(57) ABSTRACT

The invention relates to a curable amphiphilic siloxane polyurethane coating composition. The invention also relates to methods of making and using the curable amphiphilic siloxane polyurethane coating composition of the invention. The invention also relates to methods for reducing or preventing biofouling of a surface exposed to an aqueous environment comprising the use of the curable amphiphilic siloxane polyurethane coating composition of the invention.

19 Claims, 9 Drawing Sheets

(56) References Cited

OTHER PUBLICATIONS

Heuberger et al., "Interaction Forces and Morphology of a Protein-Resistant Poly(ethylene glycol) Layer," Biophysical Journal, 2005, 88(1), 495-504.

Jeon et al., "Protein-Surface Interactions in the Presence of Polyethylene Oxide," Journal of Colloid and Interface Science, 1991, 142(1), 149-158.

Bowen et al., "The Influence of Surface Lubricity on the Adhesion of Navicula Perminuta and Ulva Linza to Alkanethiol Self-Assembled Monolayers," Journal of The Royal Society Interface, 2007, 4(14), 473-477.

Prime et al., "Adsorption of Proteins onto Surfaces Containing End-Attached Oligo(ethylene oxide): A Model System Using Self-Assembled Monolayers," J. Am. Chem. Soc., 1993, 115(23), 10714-10721.

Jiang et al., "Ultralow-Fouling, Functionalizable, and Hydrolyzable Zwitterionic Materials and Their Derivatives for Biological Applications," Adv. Mater., 2010, 22(9), 920-932.

Wu et al., "Large-Scale Synthesis of High-Quality Graphene Sheets by an Improved Alternating Current Arc-Discharge Method," RSC Advances, 2016, 6 (30), 24827-24834.

Bodkhe et al., "Zwitterionic Siloxane-Polyurethane Fouling-Release Coatings," Progress in Organic Coatings, 2015, 78(1), 369-380.

Coneski et al., "Zwitterionic Polyurethane Hydrogels Derived from Carboxybetaine-Functionalized Diols," ACS Appl. Mater. Interfaces, 2012, 4(9), 4465-4469.

Ekin et al., "Combinatorial and High-Throughput Screening of the Effect of Siloxane Composition on the Surface Properties of Crosslinked Siloxane-Polyurethane Coatings," J. Comb. Chem., 2007, 9(1), 178-188.

Sommer et al., "A Preliminary Study on the Properties and Foulingrelease Performance of Siloxane-Polyurethane Coatings Prepared from Poly(dimethylsiloxane) (PDMS) Macromers," Biofouling, 2010, 26(8), 961-972.

Sommer et al., "Effects of Pigmentation on Siloxane-Polyurethane Coatings and Their Performance as Fouling-Release Marine Coatings," J. Coat. Technol. Res., 2011, 8(6), 661-670.

Bodkhe et al., "Polyurethanes with Amphiphilic Surfaces Made Using Telechelic Functional PDMS Having Orthogonal Acid Functional Groups," Progress in Organic Coatings, 2012, 75, 38-48.

Bodkhe et al., "The Effect of Formulation Variables on Fouling-Release Performance of Stratified Siloxane-Polyurethane Coatings," J. Coat. Technol. Res., 2012, 9(3), 235-249.

Stafslien et al., "Combinatorial Materials Research Applied to the Development of New Surface Coatings VI: An Automated Spinning Water Jet Apparatus for the High-Throughput Characterization of Fouling-Release Marine Coatings," Rev. Sci. Instrum., 2007, 78(7), 072204.

Callow et al., "Efficacy Testing of Nonbiological and Fouling-Release Coatings," Biofouling Methods, John Wiley & Sons, Ltd, 2014, pp. 291-316.

Stafslien et al., "Combinatorial Materials Research Applied to the Development of New Surface Coatings IV. A High-Throughput Bacterial Biofilm Retention and Retraction Assay for Screening Fouling-Release Performance of Coatings," Biofouling, 2007, 23(1), 45-54.

Casse et al., "Laboratory Screening of Coating Libraries for Algal Adhesion," Biofouling, 2007, 23(3/4), 267-276.

Casse et al., "Combinatorial Materials Research Applied to the Development of New Surface Coatings V. Application of a Spinning Water-Jet for the Semi-high Throughput Assessment of the Attachment Strength of Marine Fouling Algae," Biofouling 2007, 23(2), 121-130.

Stafslien et al., "An Improved Laboratory Reattachment Method for the Rapid Assessment of Adult Barnacle Adhesion Strength to Fouling-Release Marine Coatings," J. Coat. Technol. Res., 2012, 9(6), 651-665.

Rittschof et al., "Barnacle Reattachment: A Tool for Studying Barnacle Adhesion," Biofouling, 2008, 24(1), 1-9.

Bell et al., "Strategies for Life in Flow: Tenacity, Morphometry, and Probability of Dislodgment of Two Mytilus Species," Mar. Ecol. Prog. Ser., 1997, 159, 197-208.

Burkett et al., "A Method for Measuring the Adhesion Strength of Marine Mussels," The Journal of Adhesion, 2009, 85(9), 601-615.

Crisp et al., "Adhesion and Substrate Choice in Mussels and Barnacles," Journal of Colloid and Interface Science, 1985, 104(1), 40-50.

Holland et al., "Adhesion and Motility of Fouling Diatoms on a Silicone Elastomer," Biofouling, 2004, 20(6), 323-329.

Aldred et al., "Attachment Strength is a Key Factor in the Selection of Surfaces by Barnacle Cyprids (*Balanus amphitrite*) During Settlement," Biofouling, 2010, 26(3), 287-299.

Yebra et al., "Antifouling Technology—Past, Present and Future Steps Towards Efficient and Environmentally Friendly Antifouling Coatings," Progress in Organic Coatings, 2004, 50(2), 75-104.

Callow et al., "Marine Biofouling: A Sticky Problem," Biologist, 2002, 49(1), 1-5.

Callow et al., "Trends in the Development of Environmentally Friendly Fouling-Resistant Marine Coatings," Nat. Commun., 2011, 2, 244.

Lejars et al., "Fouling Release Coatings: A Nontoxic Alternative to Biocidal Antifouling Coatings," Chem. Rev., 2012, 112(8), 4347-4390.

Nurioglu et al., "Non-toxic, Non-Biocide-Release Antifouling Coatings Based on Molecular Structure Design for Marine Applications," J. Mater. Chem. B, 2015, 3(32), 6547-6570.

Tribou et al., "The Use of Proactive In-Water Grooming to Improve the Performance of Ship Hull Antifouling Coatings," Biofouling, 2010, 26(1), 47-56.

Schultz et al., "The Influence of Biofilms on Skin Friction Drag," Biofouling, 2000, 15(1-3), 129-139.

Schultz et al., "Frictional Resistance of Antifouling Coating Systems," Journal of Fluids Engineering, 2005, 126(6), 1039-1047.

Schultz et al., "Economic Impact of Biofouling on a Naval Surface Ship," Biofouling, 2011, 27(1), 87-98.

Schultz et al., "Impact of Diatomaceous Biofilms on the Frictional Drag of Fouling-Release Coatings," Biofouling, 2015, 31(9-10), 759-773.

Szleifer et al., "Polymers and Proteins: Interactions at Interfaces," Current Opinion in Solid State and Materials Science, 1997, 2(3), 337-344.

\* cited by examiner ically dynamic surfaces.[7] On the other hand, the slime resulting from microfouling is difficult to release even with high hydrodynamic forces given the low surface profile of slime (typically a thin layer).[8-10] However slime fouling can significantly affect fuel consumption due to increased frictional drag. Studies have shown heavy slime can result in 10.1% increase in fuel costs.[11] Recent developments in FR technology has been focused on inhibiting settlement of microfouling organisms during idle periods.
AMPHIPHILIC SILOXANE POLYURETHANE COATING COMPOSITIONS AND METHODS OF MAKING AND USING THEREOF

CROSS-REFERENCE TO RELATED APPLICATIONS

This application claims priority to U.S. Provisional Application No. 62/947,173, filed Dec. 12, 2019, the disclosure of which is incorporated herein by reference.

STATEMENT OF U.S. GOVERNMENT SUPPORT

This invention was made with government support under grant N00014-12-1-0482 awarded by the Office of Naval Research (ONR). The U.S. government has certain rights in the invention.

BACKGROUND

Developing an effective non-toxic coating solution to marine biofouling is a modern-day challenge given the number of marine organisms in the oceans and their diverse surface preferences. Constant colonization and accumulation of marine organisms on ocean immersed structures is known as marine biofouling.[1] The magnitude of the economic and environmental costs of biofouling is well recognized and an environmentally friendly solution is being sought after to benefit the global shipping industry.[2-4] Coatings with active tri-butyl-tin (TBT) were very effective against biofouling although they were soon found to be causing detrimental effects to non-targeted marine life.[4] In 2003, use of TBT in marine paints was prohibited by the International Maritime Organization (IMO).[1,4] Due to the prohibition of tri-butyl-tin (TBT) based antifouling (AF) coatings, copper oxide based AF coatings and fouling-release (FR) coatings gained popularity.[3-5] However, FR coatings have gained market attention as a completely non-toxic and eco-friendly approach to contend with biofouling.

Fouling-release coatings do not release toxins, rather only allowing weak attachment of marine organisms which facilitate easy removal of organisms when subjected to hydrodynamic pressure or light cleaning.[3,4] Polydimethyl siloxane (PDMS) combines several required material elements for such fouling-release applications.[1-4] Therefore, most commercial FR coating systems are often formulated with PDMS elastomers. Although early versions of PDMS based FR coatings have demonstrated excellent fouling release behavior at higher ship speeds, settlement of fouling during idle periods leads to decrease in performance over time.[6] Also, it is widely accepted that some microfouling organisms settle easily on static surfaces compared to dynamic surfaces.[7] On the other hand, the slime resulting from microfouling is difficult to release even with high hydrodynamic forces given the low surface profile of slime (typically a thin layer).[8-10] However slime fouling can significantly affect fuel consumption due to increased frictional drag. Studies have shown heavy slime can result in 10.1% increase in fuel costs.[11] Recent developments in FR technology has been focused on inhibiting settlement of microfouling organisms during idle periods.

The attachment and settlement of marine animals on surfaces is a significantly dynamic process which involves complex interfacial interactions between the organisms and the surfaces. These interactions involve physico-dynamic events which biologists have attempted to understand, although the exact nature and triggers for such behavior still remains a mystery.[1,12] Recent studies have suggested that the primary interaction of marine organisms with surfaces is through the conditioning layer of adsorbed adhesive proteins and macromoclecules.[13] Therefore, protein resistant materials are being widely explored for non-toxic marine coatings to delay the settlement of fouling specially during idle periods. Polyethylene glycol (PEG) is more commonly investigated for protein resistant materials given its ability to inhibit protein adsorbtion.[14] PEG-modified surfaces display protein resistance properties due to hydrophilic interactions with water.[5] PEG chains on the surface can bind water molecules through hydrogen bonding, creating a highly hydrated water layer minimizing the interfacial surface energy.[15] Studies have shown that water content inside the surface grafted PEG chains can be very high (about 80% by volume).[5] Disrupting the highly organized PEG-water complex is energetically costly for proteins and organic molecules, which is in fact thermodynamically unfavorable.[16,17] Also, on the other hand, when in contact with water, PEG has an interfacial low surface energy (5 mNm$^{-1}$) compared to that of PDMS (52 mNm$^{-1}$) minimizing protein adsorption.[5] Although there is active discussion about the role of PEG in protein resistance, factors such as number of repeat units of ethylene glycol and surface density of PEG have been observed to affect the degree of protein resistance.[5] Self-assembled mono-layers (SAM) containing PEG are commonly explored as protein-resistant materials for biomedical applications.[14,18] Several studies have demonstrated that protein resistant properties of SAMs can be tuned by variations introduced through the PEG component.[7,19] However, practical application of SAM for marine applications can be an overreach.[20]

Zwitterionic surfaces are also investigated as a potential non-toxic fouling resistant strategy. In contrast to PEG, protein resistant properties of zwitterionic surfaces arise from a very strongly bound electrically induced hydration layer.[3] Therefore, coatings prepared using zwitterionic polymers provide low fouling and FR properties. Zwitterionic coatings are often superhydrophillic, attributing to the tightly and commonly used poly (sulfobetaine) and poly (carboxybetaine) polymers with strong chemical stability.[21, 22] Zwitterionic coatings can also overcome the shortcomings associated with PEG based systems. Several studies have shown that zwitterionic coatings greatly reduce the settlement of marine organisms (Ulva linza and barnacles) while demonstrating FR properties towards those organisms.[21-23] Although a commercial product based on this approach is yet to be introduced, current developments show future potential.[24]

Recently developed FR coatings attempted to combine the fouling inhibition and FR properties in order to provide a more effective solution to biofouling and extend the lifetime of coating systems. Lately, several patent applications have been submitted claiming fouling resistant non-toxic coating compositions; an improvement upon earlier versions of FR coatings in addition to FR properties.[25-27] Also, multiple commercial FR coating products have been introduced to the market. Intersleek 1100SR from International paint and Hempasil X3 from Hempel AF are the newest line of FR coatings that are being promoted as fouling inhibiting/releasing marine coatings.[25] The coating compositions revealed that PDMS still remains as the major ingredient while a surface active PEG modified siloxane or fluoropolymer component is used to enhance the fouling resistance via the formation of a highly hydrated surface.

Siloxane Polyurethane (SiPU) coatings were developed as non-toxic marine coatings having superior mechanical performance and durability compared to commercial FR systems.[28,29] Previous studies have shown that SiPU coatings can have FR properties on par with commercial standards while not requiring tie coat for adhesion and having a magnitude higher bulk modulus values.[31-32] Also, the system can be tuned for optimum FR application.[23,32-34]

The inventors modified the SiPU system with hydrophilic groups to improve the FR properties. Commercially available polyisocyanate resins were subjected to modification with hydrophilic groups such as sulfobetaine, and PEG. The modified polyisocyanates were then used to formulate SiPU coatings. The synthesis of the resins was confirmed by FTIR and isocyanate titrations. The modified resins were then used to prepare pre-polymers with other components and incorporated into SIPU coatings. The coatings had various combinations of side chains; sulfobetaine-PEG, sulfobetaine-PDMS, PEG-PDMS, and just PEG. Non-reactive ethylene oxide grafted siloxane additives were also used in small quantities in coating formulations. These amphiphilic additives provide mobility for surface rearrangement to effectively express hydrophilic groups on the surface when in contact with water. A representative structure for the additives used is shown in Scheme 1. Coating surfaces were characterized using water contact angle (WCA) measurements. The effects of these side groups and amphiphilic additives on fouling release properties were investigated through several laboratory biological assays for bacteria (*Cellulophaga lytica*), microalgae (*Navicula incerta*), barnacles (*Amphibalanus amphitrite*), and marine mussels (*Geukensia demissa*).

Scheme 1. Representative structure of amphiphilic additive ethylene oxide-graft-dimethyl siloxane

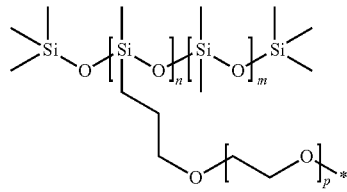

SUMMARY OF THE INVENTION

Figure 1:
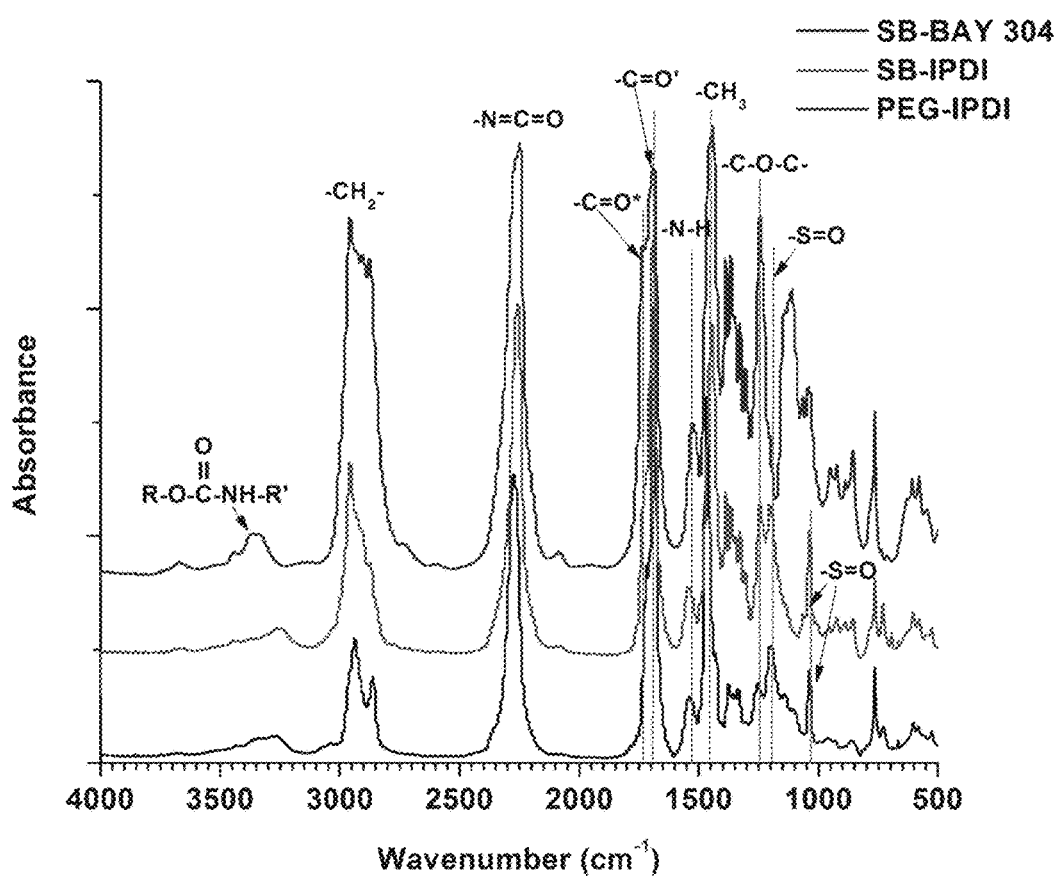
FIG. 1 shows the FTIR spectrum of modified polyisocyanate resins SB-BAY 304, SB-IPDI, and PEG-IPDI.

The invention relates to a curable amphiphilic siloxane polyurethane coating composition comprising, consisting essentially of, or consisting of the reaction product of:
  a) at least one pre-polymer, which comprises, consists essentially of, or consists of the reaction product of a1), a2), a3), and a4), wherein:
    a1) is at least one hydrophilically modified polyisocyanate comprising, consisting essentially of, or consisting of a polyisocyanate modified with at least one PEG, at least one sulfobetaine group, or mixtures thereof;
    a2) is at least one PEG;
    a3) is at least one PDMS; and
    a4) is optionally at least one catalyst;
  b) at least one polyol;
  c) at least one polyisocyanate;
  d) at least one amphiphilic additive;
  e) optionally at least one catalyst;
  f) optionally at least one solvent; and
  g) at least one pot-life extender.

The invention also relates to methods of making and using the curable amphiphilic siloxane polyurethane coating composition of the invention, to a method of making the pre-polymer, a).

The invention further relates to objects or substrates coated with the curable amphiphilic siloxane polyurethane coating composition of the invention, which may then be cured to a coating.

The invention also relates to a cured amphiphilic siloxane polyurethane coating composition of the invention.

The invention also relates to a marine fouling-release coating comprising, consisting essentially of, or consisting of the curable amphiphilic siloxane polyurethane coating composition of the invention.

The invention also relates to a method for reducing or preventing biofouling of a surface exposed to an aqueous environment comprising, consisting essentially of, or consisting of the steps of: (1) coating the surface with the curable amphiphilic siloxane polyurethane coating composition of the invention to form a coated surface, and (2) curing the amphiphilic siloxane polyurethane coating composition on the coated surface.

DESCRIPTION OF THE INVENTION

The invention relates to a curable amphiphilic siloxane polyurethane coating composition comprising, consisting essentially of, or consisting of the reaction product of:
a) at least one pre-polymer;
b) at least one polyol;
c) at least one polyisocyanate;
d) at least one amphiphilic additive;
e) optionally at least one catalyst;
f) optionally at least one solvent; and
g) optionally at least one pot-life extender.

The pre-polymer, a), used to make the curable amphiphilic siloxane polyurethane coating composition of the invention comprises, consists essentially of, or consists of the reaction product of a1), a2), a3), and a4), wherein:
a1) is at least one hydrophilically modified polyisocyanate comprising, consisting essentially of, or consisting of a polyisocyanate modified with at least one PEG, at least one sulfobetaine group, or mixtures thereof;
a2) is at least one PEG;
a3) is at least one PDMS; and
a4) is optionally at least one catalyst.

The polyisocyanate used to make the at least one hydrophilically modified polyisocyanate, a1), may be aromatic, aliphatic, or cycloaliphatic. Polyisocyanates based on methylene diphenyl diisocyanate ("MDI"), hexamethylene diisocyanate ("HMDI"), isophorone diisocyanate ("IPDI"), and the like can be used. Preferably, the polyisocyanate is an isophorone-based polyisocyanate. The polyisocyanate may be a polyisocyanate having at least three isocyanate groups such as an MDI trimer, an IPDI trimer (Desmodur Z4470 BA), and an HDI trimer (Desmodur N3300 A). Other polyisocyanates known in the art may also be used, such as Desmodur HL, Desmodur IL, triisocyanatononane, Desmodur RE, and Desmodur RFE.

The PEG used to make the at least one hydrophilically modified polyisocyanate, a1), may be a mono functional PEG selected from poly(ethylene oxide) methyl ether having molecular weights ranging from 350 g/mol to 20,000 g/mol, preferably ranging from 350 g/mol to 750 g/mol (e.g., $PEG_8$ (350 MW), $PEG_{12}$ (550 MW), $PEG_{13}$ (600 MW), $PEG_{16}$ (750 MW)) or poly(ethylene oxide) ethyl ether.

To modify the polyisocyanate with a sulfobetaine group, the polyisocyanate may be reacted with N,N'-dimethylethanolamine and 1,3-propanesultone (Scheme 2). The hydrophilically modified polyisocyanate, a1), may also be modified to impart both PEG and sulfobetaine functionality. Optionally, solvents (e.g., toluene, xylene, etc.) and catalysts (e.g., dibutyltindiacetate) may be used to make a1). Preferably, the hydrophilically modified polyisocyanate, a1), is selected from the group consisting of sulfobetaine (SB)-Bayhydur 304 (BAY 304), BAY 304, SB-IPDI, PEG IPDI, and mixtures thereof.

Scheme 2. Sulfobetaine functionalization of polyisocyanates

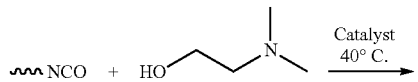

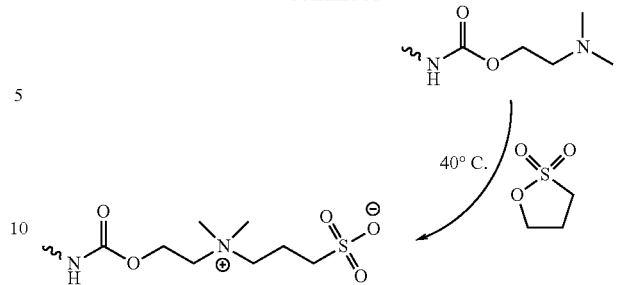

The at least one PEG, a2), may also be selected from poly(ethylene oxide) methyl ether or poly(ethylene oxide) ethyl ether. Preferably, the monofunctional PEG is $PEG_8$ (350 MW), $PEG_{12}$ (550 MW), $PEG_{13}$ (600 MW), or $PEG_{16}$ (750 MW). The PEG, a2), may be the same or different as the PEG used to make the hydrophilically modified polyisocyanate, a1).

The at least one PDMS, a3), may be a hydroxyalkyl terminated poly(dimethylsiloxane), wherein the hydroxyl alkyl group can be hydroxy propyl, hydroxy butyl, hydroxy pentyl, or hydroxyethoxypropyl. The hydroxyethoxypropyl group is also known as carbinol. The PDMS may be terminated with the hydroxyalkyl groups at one end or both (two) chain ends. Preferably, the PDMS, a3), is selected from the group consisting of $PDMS_{1k}$ (1000 MW), $PDMS_{5k}$ (5000 MW), $PDMS_{10k}$ (10000 MW), DMS-C23, DMS-C21, and mixtures thereof.

The at least one catalyst, a4), can be either organometallic complexes or organic bases, and other such catalysts known in the art. Examples of organometallic compounds are dibutyl tin dilaurate, dibutyl tin diacetate, bismuth carboxylate, and compounds of zirconium and aluminum such as K-Kat 4205, K-Kat-5218, and K-Kat-XC-6212. Examples of organic base catalysts are sold under the DABCO trade name by Air Products. DABCO is 1,4-diazabicyclo[2.2.2]octane. Suitable examples of isocyanate reaction catalysts include diethyl tin diacetate, dibuyltin diacetate, dibutyltin dilaurate, dibutyltin maleate, dilauryltin diacetate, dioctyltin diacetate, or a mixture thereof. Preferably, the optional catalyst is dibutytindiacetate (DBTDAc).

The at least one polyol, b), used to make the curable amphiphilic siloxane polyurethane coating composition of the invention may be selected from the group consisting of at least one acrylic polyol, polyester polyol, polycarbonate polyol, polyether polyol, or mixtures thereof. Preferably, the polyol is at least one acrylic polyol. The acrylic polyol used to make the curable amphiphilic siloxane polyurethane coating composition of the invention may be composed of 80% butyl acrylate and 20% 2-hydroxyethyl acrylate.

The at least one polyisocyanate, c), used to make the curable amphiphilic siloxane polyurethane coating composition of the invention may be selected from any of the polyisocyanates used to make the hydrophilically modified polyisocyanate, a1), described above. The polyisocyanate, c), may be the same or different as the polyisocyanate used to make the hydrophilically modified polyisocyanate, a1). Preferably, the polyisocyanate, c), is Desmodur Z4470 BA.

The at least one amphiphilic additive, d), used to make the curable amphiphilic siloxane polyurethane coating composition of the invention may be selected from the group consisting of copolymers of PDMS and PEG. The copolymers may be diblock copolymers, triblock copolymers, or graft copolymers, where PDMS is the backbone and PEG are the side chains. For example, the copolymer may be those disclosed in US 2019/0309187, which is incorporated herein by reference. Preferably, the amphiphilic additive is a PEG modified siloxane amphiphilic additive, such as DBE-821 or DBE-621.

The optional at least one catalyst, e), used to make the curable amphiphilic siloxane polyurethane coating composition of the invention may be selected from any of the catalysts, a4), described above. The catalyst, e), may be the same or different as the catalyst, a4). Preferably, the optional catalyst, e), is DBTDAc.

The optional at least one pot extender, f), used to make the curable amphiphilic siloxane polyurethane coating composition of the invention may be selected from the group consisting of alkane-2,4-dione (e.g., 2,4-pentadione), N,N-dialkyl acetoacetamide, alkyl acetoacetate, and the like. Preferably, the optional pot extender is 2,4-pentanedione.

The curable amphiphilic siloxane polyurethane coating composition of the invention may contain about 10-60 wt % of the at least one pre-polymer, a), about 10-70 wt % (e.g., 15-65 wt %, 25-55 wt %, 35-45 wt %) of the at least one polyol, b), about 5-25 wt % (e.g., 10-20 wt %, 12-18 wt %, 14-16 wt %) of the at least one polyisocyanate, c), about 1-15 wt % (e.g., 2-12 wt %, 4-10 wt %, 6-8 wt %) of the at least one amphiphilic additive, d), 0 to about 5 wt % (e.g., 0.01-5 wt %, 0.1-4 wt %, 1-3 wt %) of the optional at least one catalyst, e), 0 to about 80 wt % (e.g., 10-60 wt %, 20-50 wt %, 30-40 wt %) of the optional at least one solvent, f), and 0 to about 10 wt % (e.g., 0.1-10 wt %, 2-8 wt %, 4-6 wt %) of the optional at least one pot-life extended, g).

The ratio of isocyanate groups in the at least one polyisocyanate, c), to the sum of the hydroxyl groups in the at least one pre-polymer, a), and the at least one polyol, b), may be 1.0:1.0 to 1.5:1.0, preferably 1.1:1.0 to 1.2:1.0.

A coating composition of the invention, as mentioned above, may be a solvent-free coating composition or may optionally contain a solvent such as, for example, acetone, THF, methyl ethyl ketone (MEK), xylene, acetone, acetylacetone, benzene, toluene, methyl amyl ketone (MAK), methyl isobutyl ketone, butyl acetate, t-butyl acetate, ethyl 3-ethoxypropionate (EEP), isopropanol, aromatic 100, aromatic 150, tetrahydrofuran, diethyl ether, butanol, butoxyethanol, etc. The coating composition may be a solution in such a solvent or mixture of solvents.

A coating composition of the invention may further contain a pigment (organic or inorganic), if a coating having a particular color is desired, and/or additives and fillers known in the art. For example, a coating composition of the invention may further contain coating additives. Examples of such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides, and mildewcides; corrosion inhibitors; thickening agents; or coalescing agents. Specific examples of such additives can be found in Raw Materials Index, published by the National Paint & Coatings Association, 901 New York Avenue NW, Suite 300 West, Washington, DC 20001. Further examples of such additives may be found in U.S. Pat. No. 5,371,148, incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

The invention also relates to a cured amphiphilic siloxane polyurethane coating composition of the invention.

The invention further relates to objects or substrates coated with the curable amphiphilic siloxane polyurethane coating composition of the invention, which may then be cured to a coating. The coating may be cured, for example, under ambient conditions and/or using elevated temperatures.

The invention also relates to methods of using the curable amphiphilic siloxane polyurethane coating composition of the invention. For example, the invention relates to methods of making a cured amphiphilic siloxane polyurethane coating composition using the curable amphiphilic siloxane polyurethane coating composition of the invention.

The invention also relates to a marine fouling-release coating comprising, consisting essentially of, or consisting of the curable amphiphilic siloxane polyurethane coating composition of the invention.

The invention also relates to a method for reducing or preventing biofouling of a surface exposed to an aqueous environment comprising, consisting essentially of, or consisting of the steps of: (1) coating the surface with the curable amphiphilic siloxane polyurethane coating composition of the invention to form a coated surface, and (2) curing the amphiphilic siloxane polyurethane coating composition on the coated surface.

The invention also relates to a method of making the curable amphiphilic siloxane polyurethane coating composition of the invention, comprising, consisting essentially of, or consisting of: reacting the at least one pre-polymer, a), with the at least one polyol, b), the at least one polyisocyanate, c), the at least one amphiphilic additive, d), optionally the at least one catalyst, e), optionally the at least one solvent, f), and optionally the at least one pot-life extender, g).

The invention further relates to a method of making the pre-polymer, a), comprising, consisting essentially of, or consisting of: reacting the at least one hydrophilically modified polyisocyanate, a1), the at least one PEG, a2), the at least one PDMS, a3), and optionally the at least one catalyst, a4) to form the pre-polymer, a).

EXAMPLES

Materials

Covestro LLC provided polyisocyanates Bayhydur 304 (BAY-304) and Desmodur Z4470 BA. Monofunctional carbinol terminated polydimethyl siloxane (PDMS) (MCR-C18: 5000 MW, $PDMS_{Sk}$), difunctional carbinol terminated PDMS (DMS-C23: 10000 MW, and DMS-C21: 5000 MW)

as well as PEG modified siloxane (non-reactive) amphiphilic additives (DBE-821: 4400 MW with 80-85% ethylene oxide and DBE-621: 2500 MW with 50-55% ethylene oxide) were purchased from Gelest Inc. Polyethylene glycol methyl ether (PEG$_{16}$: 750 MW and PEG$_8$: 350 MW), polyethylene glycol (PEG$_{13}$: 600 MW), dimethylformamide (DMF), toluene, acetylacetone, dibutyl-tin diacetate (DBTDAc prepared as 1% by wt. in 2-heptanone) were purchased from Sigma Aldrich. An acrylic polyol composed of 80% butyl acrylate and 20% 2-hydroxyethyl acrylate was synthesized via conventional free radical polymerization and diluted to 50% with toluene. Aminopropyl terminated polydimethyl siloxane (APT-PDMS) with molecular weight 20000 g/mole was also synthesized through a ring-opening equilibration reaction. Detailed descriptions of synthesis procedures for both acrylic polyol and APT-PDMS can be found elsewhere.[33]

AkzoNobel International Paint provided the commercial FR standards Intersleek® 700 (IS 700), Intersleek® 900 (IS 900), Intersleek® 1100SR (IS 1100) commercial FR coatings, and Intergard 264 marine primer. Hempel provided Hempasil® X3 commercial FR coating. Dow Corning provided silicone elastomer, Silastic® T2 (T2). Aluminum panels (4×8 in., 0.6 mm thick, type A, alloy 3003 H14) purchased from Q-lab were sand blasted and primed with Intergard 264 using air-assisted spray application. Multi-well plates were modified using circular disks (1 inch diameter) of primed aluminum.

1 Synthesis of Pre-Polymers

1.1 Synthesis of Sulfobetaine Modified Monofunctional Poly (Ethylene Oxide) Methyl Ether Containing Polyisocyanate (SB-BAY-304)

Polyisocyanate Bayhydur 304 is based on hexamethylene diisocyanate (HDI) and modified with emulsifying PEG chain. This resin was further modified to contain sulfobetaine functionality (4:1 equivalents of NCO to hydroxyl). Bayhydur 304 (28.03 g), toluene (28.00 g), and N,N'-dimethylethanolamine (2.72 g) were combined in a 250 mL 3-neck round bottom flask equipped with mechanical stirring, nitrogen inlet, and thermocouple. The reaction mixture was heated to 40° C. using a heating mantle. The DBTDAc catalyst solution (0.57 g) was added once the reaction mixture reached the set temperature. The reaction was allowed to equilibrate for 24 hrs. The next day, the reaction mixture was further diluted with toluene (40.01 g) and 1,3-propanesultone (3.74 g) was added. The reaction was carried out for another 24 hrs at 40° C. The presence of sulfobetaine groups were confirmed by FTIR analysis. Also, the isocyanate content of the modified resin was determined post reaction.

1.2 Synthesis of Sulfobetaine Modified Isophorone Diisocyanate Based Polyisocyanate (SB-IPDI)

Isophorone diisocyanate-based polyisocyanate (Desmodur Z4470 BA) (38.54 g) was combined with toluene (17.72 g) and N,N'-dimethylethanolamine (2.38 g) in a 100 mL 3-neck round bottom flask equipped with mechanical stirring, N$_2$ inlet, and thermocouple. The reaction mixture was heated to 40° C. using a heating mantle. Once the set temperature was reached, DBTDAc catalyst solution (0.44 g) was added and allowed the reaction to equilibrate for 24 hrs. Next day, 1,3-propanesultone (3.21 g) was added. The reaction was carried out for another 24 hrs at 40° C. The isocyanate to hydroxyl equivalent ratio was maintained at 3:1. Post functionalization, the presence of sulfobetaine groups were confirmed by FTIR spectroscopy and isocyanate titrations.

1.3 Synthesis of Poly (Ethylene Oxide) Modified Isophorone Diisocyanate Based Polyisocyanate (PEG-IPDI)

Desmodur Z4470 BA resin was modified with PEG chains. In a 40 mL glass vial, Desmodur Z4470 BA (20.56 g), PEG 350 (4.94 g) and DBTDAc catalyst solution (0.16 g) were combined (3:1 isocyanate to hydroxyl equivalents). The vial was purged with nitrogen and allowed to react overnight at 35° C. under mechanical stirring. The functionalization was confirmed by FTIR analysis and isocyanate titrations.

Isocyanate Titrations

Isocyanate titration was used to confirm the presence of NCO groups after the pre-polymer synthesis. In general, a sample of pre-polymer (0.3-0.5 g) was placed in Erlenmeyer flask and diluted with isopropanol. Then, 25 mL of 0.1 N dibutyl amine solution was added to the flask followed by additional isopropanol (25 mL). Next, the solution was mixed for 15 mins. A few drops of bromophenyl blue indicator were added and titrated using a standardized 0.1 N hydrochloric acid solution until the end point of blue to yellow. A blank prepared only with 25 mL of dibutyl amine solution was also titrated using the same acid solution and then the % NCO of the pre-polymer was determined.

Characterization

Fourier Transform Infrared (FTIR) spectroscopy was used to characterize the modified polyisocyanate resins using a Thermo Scientific Nicolet 8700 FTIR instrument. The resin sample was spread on a potassium bromide (KBr) plate as a thin film prior to obtaining the spectrum. Non-volatile content of resins were determined following the ASTM D2369 standard.

1.4 Synthesis of Pre-Polymers Part 1

The first part of the pre-polymers was prepared using the components outlined in Table 1. A general synthesis procedure is described here. Modified isocyanate resin was diluted with 0.5 g of DMF and combined with monofunctional PEG and/or PDMS component in a 40 mL vial equipped with a magnetic stir bar. The first part of the pre-polymer synthesis was catalyzed with 0.02 g of the DBTDAc solution and the content was thoroughly mixed using a vortex mixer for 5 min followed by magnetic stirring for 24 hrs.

1.5 Synthesis of Pre-Polymers Part 2

Formulation components for Part 2 were directly added to appropriate formulation from Part 1. First, the modified IPDI based isocyanate component was added to the vial followed by the difunctional PEG$_{13}$ and PDMS (DMS-C23 or DMS-C21) components. Small amount of catalyst solution (DBTDAc, 0.05 g) was also added to the mixture. Then the content was mixed using a vortex mixer for 5 min and allowed to mix overnight on a magnetic stir plate.

TABLE 1

Pre-polymer compositions. Part 1 ingredients were combined first and then Part 2 ingredients were added into Part 1

| | Part 1 | | | | | Part 2 | | | | |
|---|---|---|---|---|---|---|---|---|---|---|
| Pre-polymer | SB-BAY 304 (g) | BAY-304 (g) | DMF (g) | $PEG_{16}$ (g) | $PDMS_{5k}$ (g) | $PEG_{13}$ (g) | DMS-C23 (g) | DMS-C21 (g) | SB-IPDI (g) | PEG-IPDI (g) |
| 1 | 5.49 | — | 0.51 | 1.21 | — | 0.82 | 2.04 | — | 3.43 | — |
| 2 | 2.04 | — | 0.50 | — | 3.00 | 0.82 | — | 1.20 | 5.91 | — |
| 3 | — | 3.51 | 0.51 | 1.86 | — | 0.82 | 2.02 | — | — | 4.70 |
| 4 | — | 0.90 | 0.50 | 1.21 | 1.81 | 0.82 | — | 1.22 | — | 4.18 |
| 5 | 5.51 | — | 0.51 | 1.26 | — | 0.80 | 2.01 | — | 3.40 | — |
| 6 | 2.09 | — | 0.51 | — | 3.00 | 0.81 | — | 1.21 | 5.93 | — |
| 7 | — | 3.48 | 0.51 | 1.87 | — | 0.81 | 2.02 | — | — | 4.73 |
| 8 | — | 0.92 | 0.51 | 1.29 | 1.81 | 0.82 | — | 1.20 | — | 4.15 |
| 9 | 2.06 | — | 0.51 | — | 3.01 | — | — | — | — | — |
| 10 | 1.82 | — | 0.50 | 1.21 | 1.80 | — | — | — | — | — |
| 11 | 2.07 | — | 0.51 | — | 3.00 | — | — | — | — | — |
| 12 | — | 1.80 | 0.50 | 1.21 | 1.80 | — | — | — | — | — |

2 Coating Formulation

Coating formulations were prepared by adding acrylic polyol, additional polyisocyanate (Desmodur Z4470 BA), amphiphilic additive, catalyst solution, and pot-life extender into a vial containing the pre-polymers listed in Table 1 according to the formulations in Table 2. Then, the contents were thoroughly mixed using the vortex mixer for 5 min and allowed to mix for an additional 1 hr by magnetic stirring. After mixing, the coating formulations were deposited into multi-well plates using an automatic repeat pipette (250 µL of formulation was deposited into each well in multi-well plate). Drawdowns were also made on primed 8"×4" aluminum panels using a wire-wound drawdown bar with a wet film thickness of 80 µm. All coatings were allowed to cure under ambient conditions for 24 hrs followed by oven curing at 80° C. for 45 min.

TABLE 2

Additional components (Part 3) added to the pre-polymers from Table 1 to prepare SiPU coatings.

| Coatings | Acrylic Polyol (g) | Desmodur Z4470 BA (g) | DBE-821 (g) | DBE-621 (g) | DBTDAc in MAK (g) | Pot-life extender (g) |
|---|---|---|---|---|---|---|
| 1 | 16.03 | 5.90 | 1.03 | — | 0.03 | 0.05 |
| 2 | 14.57 | 5.21 | 1.00 | — | 0.03 | 0.05 |
| 3 | 15.18 | 5.50 | 1.02 | — | 0.03 | 0.05 |
| 4 | 14.61 | 5.16 | 1.01 | — | 0.03 | 0.05 |
| 5 | 16.03 | 5.91 | 0.51 | 0.52 | 0.03 | 0.05 |
| 6 | 14.58 | 5.24 | 0.52 | 0.50 | 0.03 | 0.05 |
| 7 | 15.20 | 5.55 | 0.50 | 0.51 | 0.03 | 0.05 |
| 8 | 14.54 | 5.16 | 0.52 | 0.52 | 0.03 | 0.05 |
| 9 | 20.02 | 8.64 | 1.01 | — | 0.05 | 0.06 |
| 10 | 20.65 | 6.68 | 1.01 | — | 0.05 | 0.06 |
| 11 | 20.02 | 8.66 | 0.51 | 0.51 | 0.05 | 0.06 |
| 12 | 20.67 | 6.67 | 0.51 | 0.51 | 0.05 | 0.06 |

In the case of coatings 9-12, Part 3 followed directly after Part 1 (FIG. 9) without addition of Part 2 components. The cores of polyisocyanates are color coordinated to indicate structural similarities.

Control and Standard Coatings

Commercial standards were prepared following manufacturer's specifications. Control A4-20 was prepared following the procedure outlined in a previous study.[33] Similar to experimental coatings all control and standards were also prepared on 8"×4" primed aluminum panels and multi-well plates. Table 3 contains detailed descriptions of the control and standard coatings used for this experiment.

TABLE 3

List of control and standard coatings

| Coating | Name | Description |
|---|---|---|
| 13 | A4-20% | Internal Siloxane-PU FR Control |
| 14 | Hempasil X3 | Silicone Hydrogel based Commercial FR Standard |
| 15 | NDSU-PU | Pure Polyurethane Standard |
| 16 | Dow T2 | Silicone Elastomer Standard |
| 17 | IS 700 | Intersleek Commercial FR Standard |

TABLE 3-continued

List of control and standard coatings

| Coating | Name | Description |
|---|---|---|
| 18 | IS 900 | Intersleek Commercial FR Standard |
| 19 | IS 1100 | Intersleek Commercial FR Standard |

2.1 Water Contact Angle Measurements

All experimental coatings were characterized using water contact angles (WCA) using the Symyx® surface energy system prior to water aging. The WCAs of coatings were obtained at 0, 2, 4, 6, 8, and 10 min time intervals. Three measurements of WCA were obtained using First Ten Angstroms™ software. Then average WCA for each time was recorded with standard deviation of the mean. Similarly, WCAs of control A4-20 and commercial standards IS 900 and Hempasil X3 were measured.

2.2 Water Aging

All the coatings were pre-leached for 28 days in running tap water. Coated multi-well plates and panels were placed in a tap-water aquarium system equipped with automated filling/emptying capability where the tank water was emptied and refilled every 4 hrs.

2.3 Biological Laboratory Assays

2.3.1 Bacterial (Cellulophaga lytica) Biofilm Adhesion

Fouling-release properties towards bacteria was evaluated using retention and adhesion assays described previously.[35-37] A suspension consisting of the marine bacterium *Cellulophaga lytica* at $10^7$ cells/mL concentration in ASW containing 0.5 g/L peptone and 0.1 g/L yeast extract was deposited in to 24-well plates (1 mL/well). The plates were then incubated statically at 28° C. for 24 hours. The ASW growth medium was then removed and the coatings were subjected to water-jet treatments. The first column of each coating (3 replicate wells) was not treated and served as the initial amount of bacterial biofilm growth. The second column (3 replicate wells) was subjected to water-jetting at 10 psi for 5 seconds. Following water-jet treatments, the coating surfaces were stained with 0.5 mL of a crystal violet solution (0.3 wt. % in deionized water) for 15 minutes and then rinsed three times with deionized water. After 1 hour of drying at ambient laboratory conditions, the crystal violet dye was extracted from the coating surfaces by adding 0.5 mL of 33% acetic acid solution for 15 minutes. The resulting eluates were transferred to a 96-well plate (0.15 mL/coating replicate) and subjected to absorbance measurements at 600 nm wavelength using a multi-well plate spectrophotometer. The absorbance values were directly proportional to the amount of bacterial biofilm present on coating surfaces before and after water-jetting treatments. Percent removal of bacterial biofilm was quantified by comparing the mean absorbance values of the non-jetted and water-jetted coating surfaces.[38]

2.3.2 Growth and Release of Microalgae (Navicula incerta)

Laboratory biological assay to evaluate FR properties of coatings towards diatom (*Navicula incerta*) was conducted at NDSU following a similar procedure described previously.[36,39] Briefly, a suspension with $4 \times 10^5$ cells/mL of *N. incerta* (adjusted to 0.03 OD at absorbance 660 nm) in Guillard's F/2 medium was deposited into each well (1 mL per well) and cell attachment was stimulated by static incubation for 2 hours under ambient conditions in the dark. Coating surfaces were then subjected to water-jet treatments.[35] First column of wells (3 wells) were not water-jetted so that initial cell attachment could be determined and the next column of wells (3 wells) were water-jetted at 20 psi for 10 seconds. Microalgae biomass was quantified by extracting chlorophyll using 0.5 mL of DMSO and measuring fluorescence of the transferred extracts at an excitation wavelength of 360 nm and emission wavelength at 670 nm. The relative fluorescence (RFU) measured from the extracts was directly proportional to the biomass remaining on the coating surfaces after water-jetting. Percent removal of attached microalgae was determined using relative fluorescence of non-jetted and water-jetted wells.

2.3.3 Adult Barnacle (Amphibalanus amphitrite) Adhesion

An adult barnacle reattachment and adhesion assay was used to evaluate the fouling-release properties of the coatings towards macrofoulers.[40,41] Coatings prepared on 8×4" panels after water aging were utilized for this laboratory assay. Barnacles were dislodged from silicone substrates sent from Duke University and immobilized on experimental coatings (6 barnacles per coating) using a custom-designed immobilization template. The immobilized barnacles were allowed to reattach and grow for 2 weeks while immersed in an ASW aquarium tank system with daily feedings of brine shrimp Artemia nauplii (Florida Aqua Farms). After the 2-week attachment period, the number of non-attached barnacles was recorded and the attached barnacles were pushed off (in shear) using a hand-held force gauge mounted onto a semi-automated stage. Once the barnacles were dislodged, their basal plate areas were determined from scanned images using Sigma Scan Pro 5.0 software program. Barnacle adhesion strength (MPa) was calculated by taking the ratio of peak force of removal to the basal plate area for each reattached barnacle. The average barnacle adhesion strength for each coating was reported as a function of the number of barnacles released with a measurable force and that exhibited no visible damage to the basis or shell plates.

2.3.4 Mussel (Geukensia demissa) Adhesion

Slightly modified version of previously published protocol was used to evaluate adhesion of marine mussels to coatings in a laboratory assay.[42-44] Marine ribbed mussels (*Geukensia demissa*; 3-5 cm length) were received from Duke University Marine Laboratory in Beaufort, North Carolina, USA. Prior to the attachment experiment, each mussel was modified with a 4 cm long acetal plastic rod (product #98873A105, McMaster-Carr) (perpendicular to the ventral edge) glued using a 3M® acrylic adhesive (product #7467A135, McMaster-Carr). Six mussels were then immobilized on to each coating surface using a custom-designed template fabricated from PVC sheets. The coatings with immobilized mussels were then placed in an ASW aquarium system and fed daily with live marine phytoplankton (DTs Premium Reef Blend Phytoplankton) for 3 days. After 3 days, the coatings were removed from the ASW aquarium tank system and the total number of mussels exhibiting attachment of byssus threads was recorded for each coating. The plastic rod glued to each attached mussel was then affixed to individual 5 Newton load cells of a custom-built tensile force gauge where all mussels were pulled off simultaneously (1 mm $s^{-1}$ pull rate). The total force (Newton) required to completely detach all byssus threads for each mussel was recorded and the mean value of the total number of attached mussels for each coating was calculated.

Results/Characterization

Polyisocyanates modified with sulfobetaine, PEG, and PDMS side chains were incorporated into SiPU coatings. Commercially available polyisocyanate resins were subjected to modification and successful modification was confirmed by FTIR and isocyanate titrations. The coatings had various combinations of side chains; sulfobetaine-PEG, sulfobetaine-PDMS, PEG-PDMS, and just PEG. The effects of these side group on fouling release properties were investigated through several laboratory biological assays.

Modifying polyisocyanates to have sulfobetaine functional groups is carried out by sequential reactions (Scheme 2 above). First, the isocyanate groups (1 equivalent) were reacted with N,N'-dimethylethanolamine catalyzed by DBTDAc at slightly elevated temperature. Then, after 24 hrs, 1,3-propanesultone was added. Tertiary amine from the N,N'-dimethylethanolamine readily reacts with 1,3-propanesultone to form sulfobetaine group (common synthesis route used for obtaining sulfobetaine group). Since the sulfobetaine groups are highly polar resins, they need to be diluted with solvents to achieve workable viscosity. Sulfobetaine modified polyisocyanates of Bayhydur 304 and Desmodur Z4470 BA were prepared for this experiment. They are denoted as SB-BAY 304 and SB-IPDI. Another derivative resin from Desmodur Z4470 BA was synthesized using a short chain PEG to be used in coating formulations (IPDI-PEG). Polyethylene glycol methyl ether with Mn=350 was reacted with IPDI trimer with the presence of DBTDAc maintaining an NCO:OH equivalent ratio of 3:1.

Table 4 shows the experimentally determined isocyanate content of the modified polyisocyanate resins. The modified isocyanate resins should have the majority of isocyanate groups intact after functionalization which will be used for crosslinking later. Isocyanate titration method was used to confirm the presence of remaining NCO groups. Following modification with sulfobetaine and PEG, polyisocyanate resins displayed isocyanate values that were closely to that of theoretical. This indicates that the modifications to polyisocyanate resins were successful and that they can be used for coating formulation.

TABLE 4

Comparison of percent isocyanate of modified polyisocyanates

| Modified Polyisocyanate Resin | Percent solid (%) | Theoretical % NCO | Experimental % NCO |
| --- | --- | --- | --- |
| SB-BAY 304 | 34.2 | 10.15 | 9.91 ± 0.05 |
| SB-IPDI | 55.2 | 9.41 | 8.92 ± 0.25 |
| PEG-IPDI | 74.2 | 7.95 | 7.12 ± 0.04 |

FIG. 1 shows the FTIR spectra of the modified polyisocyanate resins. For all three modified polyisocyanates, the peak at 2270 cm$^{-1}$ indicated the presence of remaining isocyanate which was later used for crosslinking reactions. The peak at 3200-3400 cm$^{-1}$ indicated the presence of the —N—H stretching from the carbamate group. However, the —N—H stretching was more prominent on PEG-IPDI compared to sulfobetaine modified resins. All three resins show the carbamate carbonyl (—C═O*) around 1696 cm$^1$ indicating the successful reaction of corresponding side chains. The other carbonyl (—C═O*) arise from the PEG-urethane linkage. The presence of the ether group (—C—O—C—) was evident from the peak at 1210 cm$^{-1}$ and the ether peak was strong on the IPDI-PEG compared to sulfobetaine modified resins. Bayhydur 304 polyisocyanate has some PEG modification thus explaining the presence of the small ether peak at 1210 cm$^{-1}$. The peaks at 1193 cm$^{-1}$ and 1044 cm$^{-1}$ are indicative of —S═O groups and suggest successful modification of polyisocyanate resins with sulfobetaine.

Figure 9:
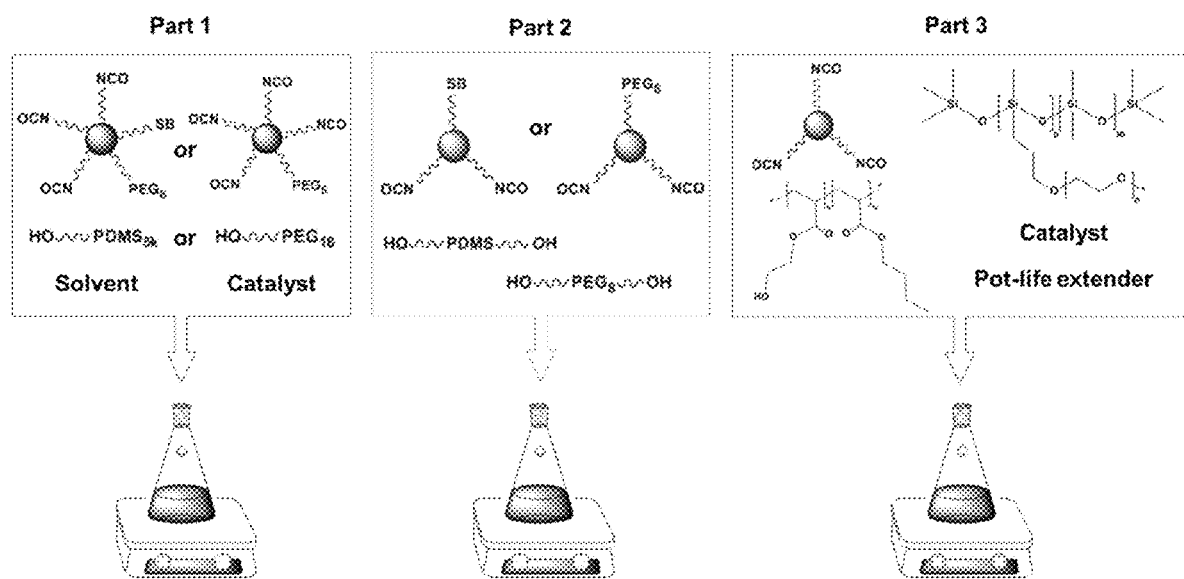
FIG. 9 shows the schematic representing the coating formulation steps.

Coating formulation consists of 3 distinct stages (FIG. 9). First the polyisocyanate resins were reacted with PEG$_{16}$ (750 MW) or PDMS$_{5k}$ (5000 MW) side chains. A representative structure for the pre-polymer from Part 1 is shown in Scheme 3. Remaining NCO groups are indicated by X and the possible side chain modifications are indicated by Y. Formulation 1 and 2 are based on SB-BAY 304 resin, difference being 1 having PEG$_{16}$ and 2 having PDMS$_{5k}$ (Y from 4 can be sulfobetaine and PEG$_{16}$ or sulfobetaine and PDMS$_{5k}$). Formulation 3 and 4 are based on unmodified Bayhydur 304 with PEG$_{16}$ and PDMS$_{5k}$ side chains respectively (Y from Scheme 3 can be exclusively PEG$_{16}$ or a combination of PEG$_{16}$ and PDMS$_{5k}$). After the first step, additional difunctional PEG$_{13}$, PDMS (DMS-C21 or DMS-C23) were added along with modified IPDI polyisocyanate (SB-IPDI or PEG-IPDI). Finally, the formulations were completed with the addition of acrylic polyol, additional isocyanate, pot-life extender, catalyst, and non-reactive amphiphilic additive (DBE-821). The formulations 5-8 consists of the same composition except a combination of non-reactive amphiphilic additives was used (DBE-821 and DBE-621). Formulations 9, 10, 11, and 12 only consist of part 1 for pre-polymer preparation. Pre-polymer for formulation 9 and 10 were based on SB-BAY 304. While formulation 9 was with sulfobetaine and PDMS$_{5k}$ side chains, formulation 10 additionally contained PEG$_{16}$ side chains as well (F9, Y could be sulfobetaine and PDMS$_{5k}$, for F10, Y could be sulfobetaine, PDMS$_{5k}$ and PEG$_{16}$). Coatings 11 and 12 consisted of the same pre-polymer as in 9 and 10 respectively yet had a combination of the non-reactive amphiphilic additive.

Scheme 3. General representative structure for pre-polymers (part 1)

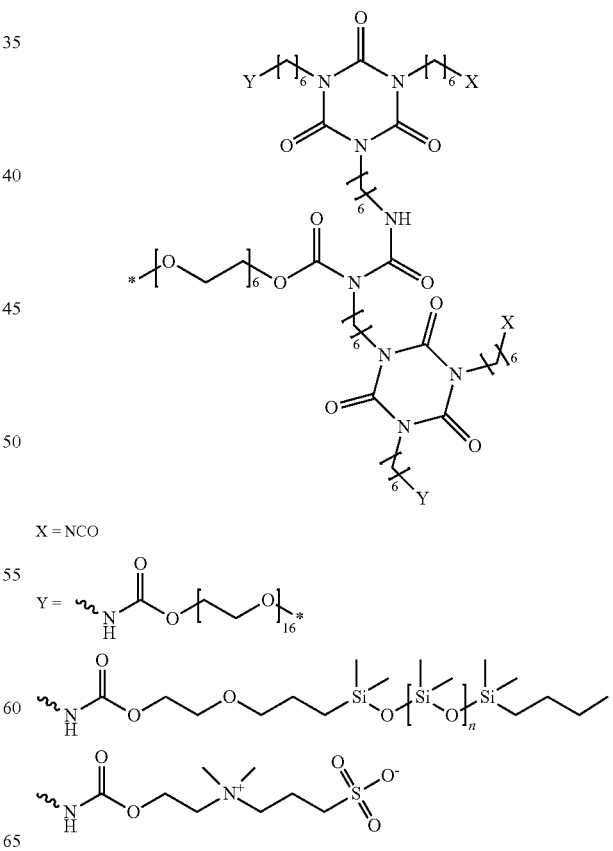

Scheme 3. General Representative Structure for Pre-Polymers (Part 1)

Figure 2:
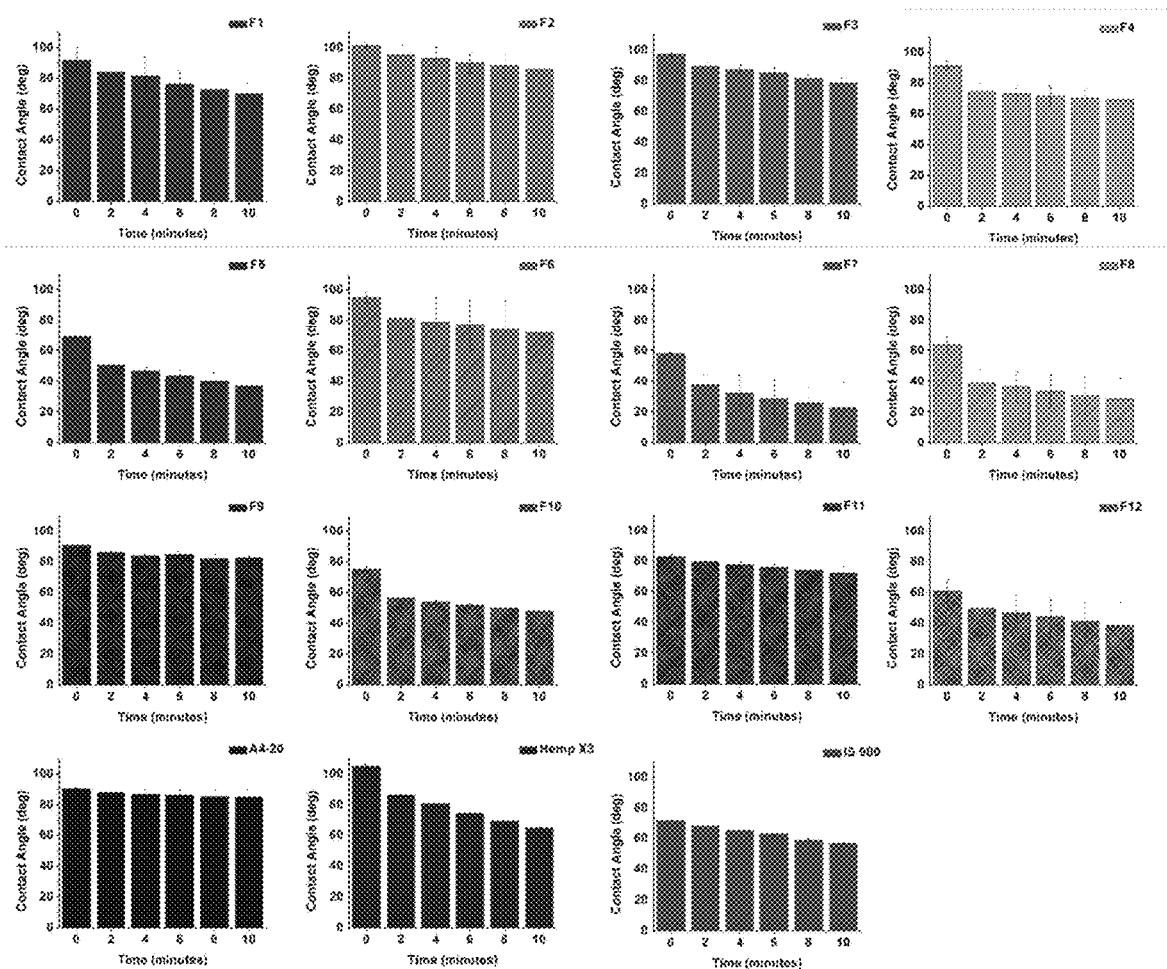
FIG. 2 shows the water contact angles for coatings observed over 2 min interval for 10 min. Each bar represents the average of 3 replicate measurements and the error bars represent the standard deviation of the mean.

FIG. 2 shows the water contact angle measurements of the coatings taken every two minutes over a period of ten minutes. Several of the coatings prepared for this experiment displayed a change in WCA over time. Almost all experimental coatings showed a change in WCA from hydrophobic to hydrophilic whereas some changed more than others. In general, all the experimental coatings showed WCA of equal or less than 100° initially. Coating 1 (with sulfobetaine-PEG side chains) displayed a higher decrease in WCA at each time interval compared to Coating 2 (with sulfobetaine-PDMS side chains). Coating 3 (PEG side chains) showed a more gradual decrease in WCA while coating 4 (PEG-PDMS side chains) showed a significant decrease in WCA initially and very little change over time. Coatings 5-8 displayed lower WCA angles than that of coatings 1-4. The WCAs for coatings 5-8 suggest that the surfaces were more hydrophilic compared to those of coatings 1-4. After 10 min coating 5, 7, and 8 show WCA in 35-40° range. Since coatings 5-8 were made using the same pre-polymers used in coatings 1-4, the observed difference in WCA may be attributed due to the addition of the non-reactive amphiphilic additive DBE-621. Coatings 9-12 also showed decreasing WCA with time yet having a combination of multiple amphiphilic additives (DBE 621 and 821) vs. a single amphiphilic additive (DBE-821) did not affect the WCAs of the coatings significantly. Commercial standards Hempasil X3 and IS 900 also demonstrated decreasing WCAs, a trend comparable to that observed for several experimental coatings. However, IS 900 was relatively hydrophilic to begin with compared to Hempasil X3. Results suggest that during WCA experiment, coatings 1, 2, 3, and 6 behaved similarly to Hempasil X3 while coatings 5, 7, 8, 10 and 12 behaved similarly to IS 900. This rapid change in surface wettability has not been observed for SiPU coating systems previously. In fact, the A4-20 control did not show much change in WCA with time. This new feature may influence the FR properties of SiPU coatings. However, further characterization of surface morphology is needed to identify the underlying principle for rapid surface wettability change in coatings. X-ray photoelectron spectroscopy (XPS) and atomic force microscopy (AFM) may provide in depth details of the coating surface compositions.

Figure 3:
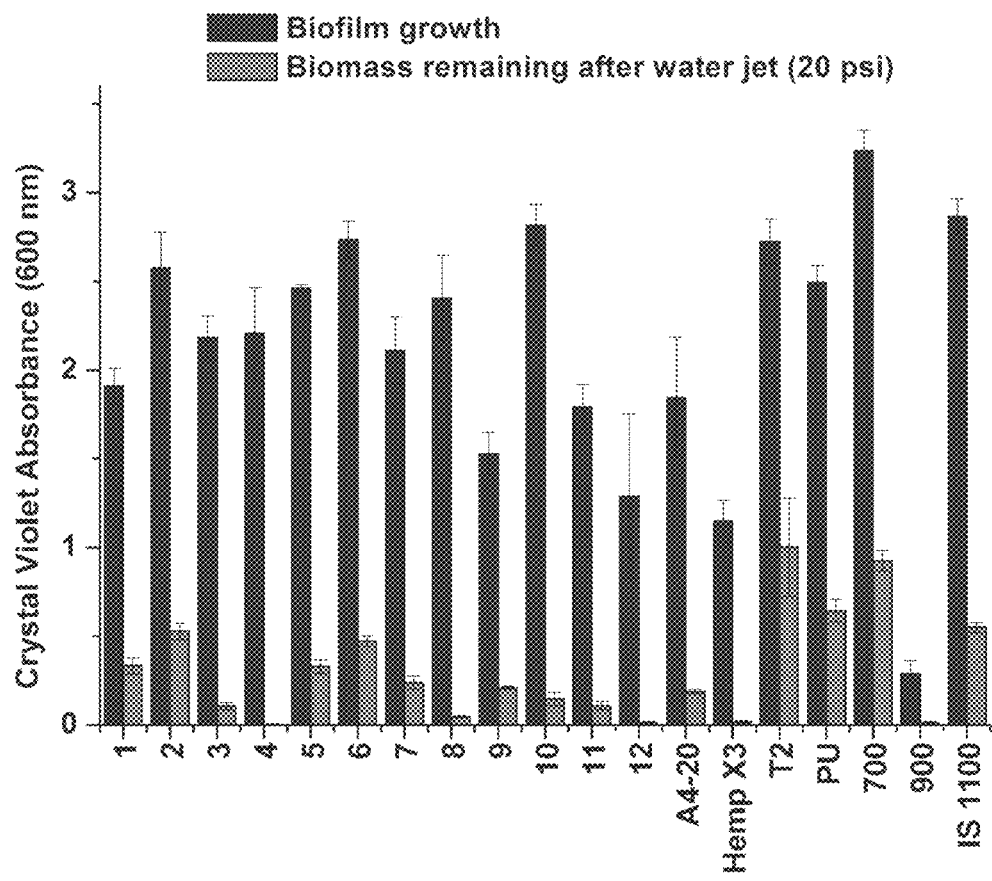
FIG. 3 shows the bacterial biofilm (*C. lytica*) growth and retention after water-jet treatment at 20 psi pressure. Each bar represents the average of 3 replicate measurements for each analyzed coating composition, and the error bars represent the standard deviation of the mean.
Figure 4:
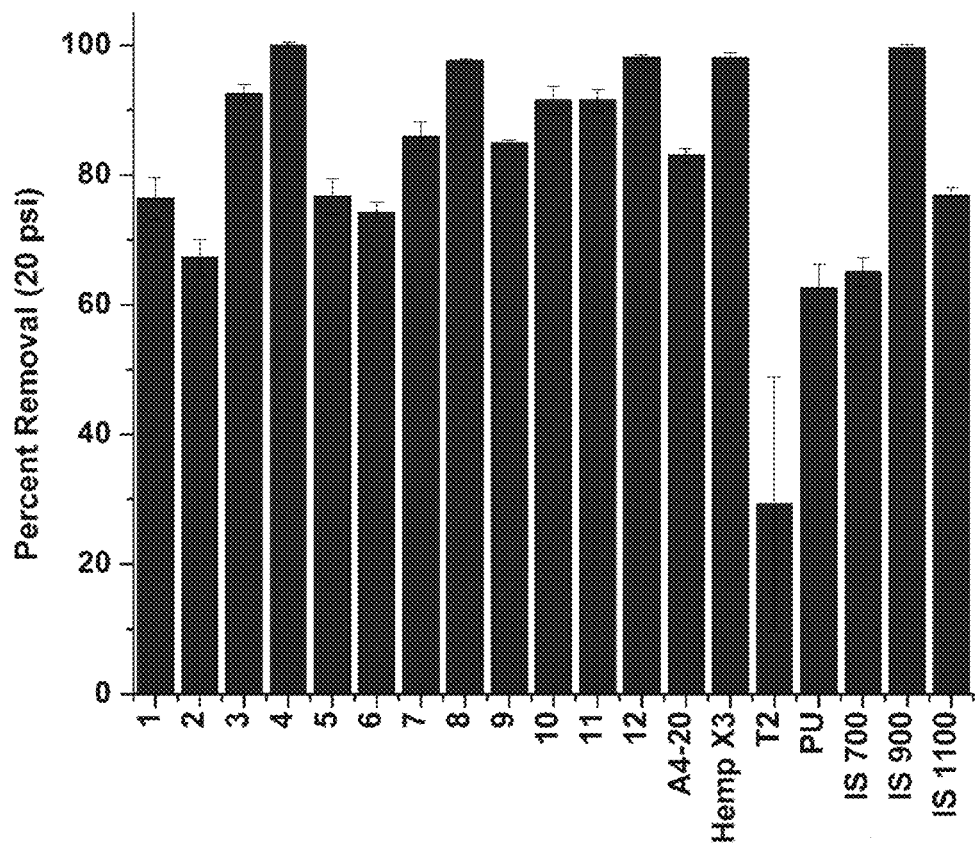
FIG. 4 shows the percent removal of *C. lytica* biofilm from the coatings. Each bar represents the average of 3 replicate measurements for each analyzed coating composition, and the error bars represent the standard deviation of the mean.

Fouling release properties of coatings were evaluated using the *C. lytica* bacterial biofilm growth and removal assay. FIG. 3 shows the amount of biomass on coatings before and after water jet treatment. The absorbance of crystal violet at 600 nm is directly proportional to the biomass present on the coating surface. Many experimental coatings showed bacterial biofilm growth similar to silicone standard T2 and commercial FR standard IS 1100. However, coatings 9, 11, and 12 showed slightly lower biomass compared to other experimental coatings and the amount of biofilm growth was similar to that of Hempasil X3 FR standard. All experimental coatings show very little bacterial biofilm remaining after a 20 psi water jet treatment, suggesting excellent FR properties. More specifically, coatings 4, 8, and 12 showed almost complete removal of *C. lytica* biofilm just like Hempasil X3. Interestingly, coatings 4, 8, and 12 contained the pre-polymers with high amount of $PEG_{16}$ and $PDMS_{5k}$ side chains. It was noticed that IS 900 only allowed very little biofilm growth (IS 900 had some toxicity during the leachate toxicity assay). FIG. 4 presents the removal of bacterial biofilm from the coatings. Coatings 3, 4, 8, 10, 11, and 12 released more than 90% of the *C. lytica* biofilm grown on the surface; an improvement compared to the internal control SiPU coating (A4-20). All experimental coatings outperformed standards IS 700, T2 and PU. Coatings with sulfobetaine side chains (1, 2, 5, and 6) demonstrated similar biofilm removal compared to IS 1100 yet not quite good as IS 900 and Hempasil X3 standards. Coatings 4, 8, and 12 showed the best FR performance towards *C. lytica* (=100% biofilm removal) which was on par with commercial FR standards HempasilX3 and IS 900.

Figure 5:
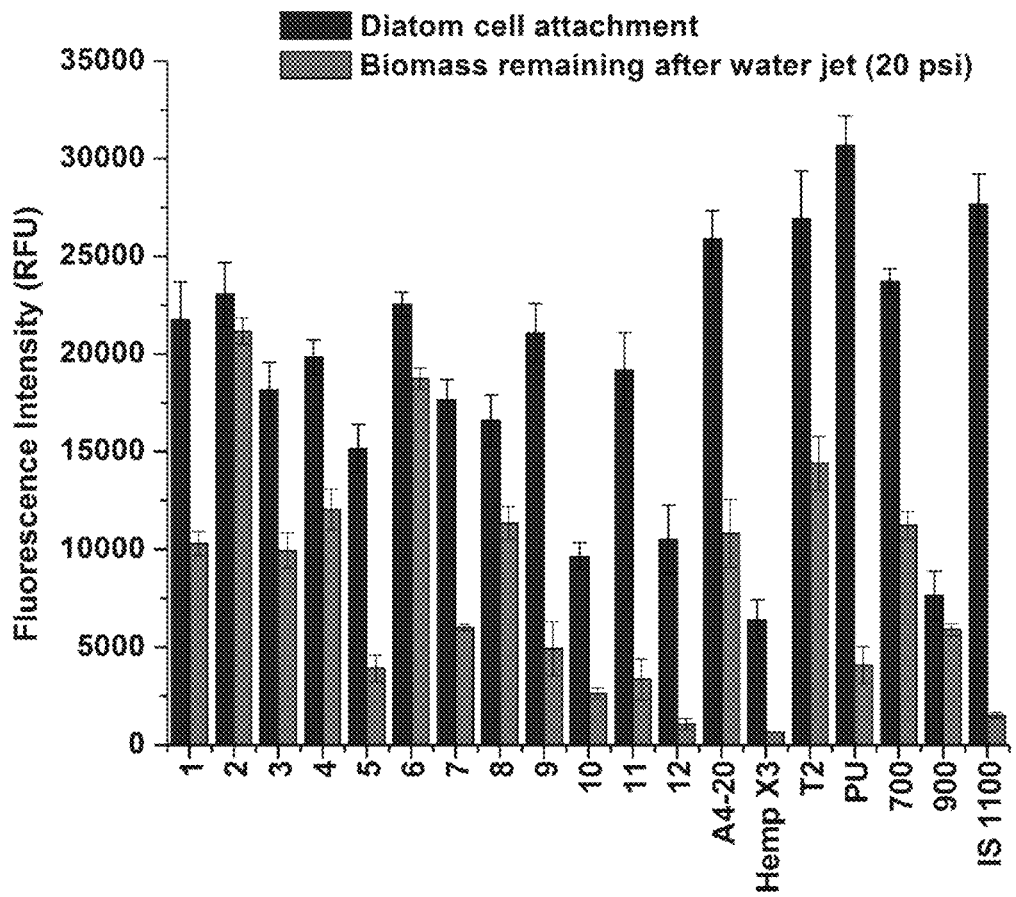
FIG. 5 shows the microalgae (*N. incerta*) cell attachment and retention (i.e., biomass remaining) after water-jet treatment at 20 psi pressure. Each bar represents the average of 3 replicate measurements for each analyzed coating composition, and the error bars represent the standard deviation of the mean.
Figure 6:
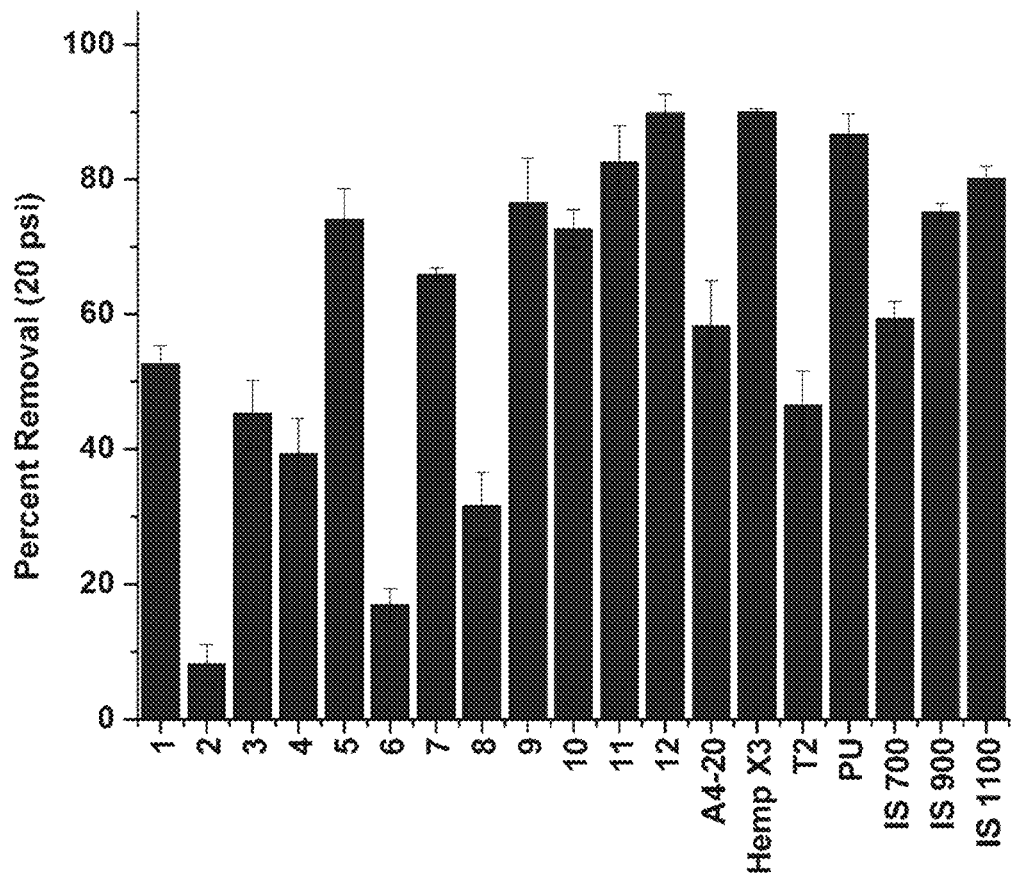
FIG. 6 shows the the removal of diatom (*N. incerta*) from the coatings. Each bar represents the average of 3 replicate measurements and the error bars represent the standard deviation of the mean.

Diatoms are microalgae that contribute to forming slime. When settled, *N. incerta* is difficult to release from hydrophobic surfaces which is attributed to their adhesion preference behavior.[7,45] Previous studies have shown that the SiPU system had relatively poor FR performance towards diatoms given the hydrophobic surface characteristics. However, recent approaches to prepare amphiphilic coating may have helped to improve the FR of SiPU coatings towards diatoms. All experimental coatings showed lower *N. incerta* cell attachment compared to A4-20, T2, PU and IS 1100 (FIG. 5). Coatings 10, 12, Hempasil X3, and IS 900 displayed very low diatom cell attachment. After water jet treatment at 20 psi, several experimental coatings (5, 9, 10, 11, and 12) showed low biomass remaining which was comparable to that of commercial standards IS 1100, Hempasil X3, and IS 900. Diatom removal is shown in FIG. 6. Coatings with pre-polymer modified with difunctional components did not show efficient diatom removal as suggested by the presence of high biomass reaming after water jet (low removal). However, coatings with pre-polymers modified with only the monofunctional components (9, 10, 11, and 12) displayed the best FR performance towards diatoms which was on par with leading commercial FR standards Hempasil X3, IS 900, and IS 1100. They also showed much better diatom removal compared to the A4-20 internal standard. Although it is necessary to confirm using surface analysis techniques, the observed trend in diatom removal suggests that the pre-polymers modified with monofunctional components may allow better surface expression of functional groups compared to those with both mono and difunctional components. Also using a combination of amphiphilic additives helped to achieve slight improvement in FR properties of coatings rather than using just DBE-821.

Figure 7:
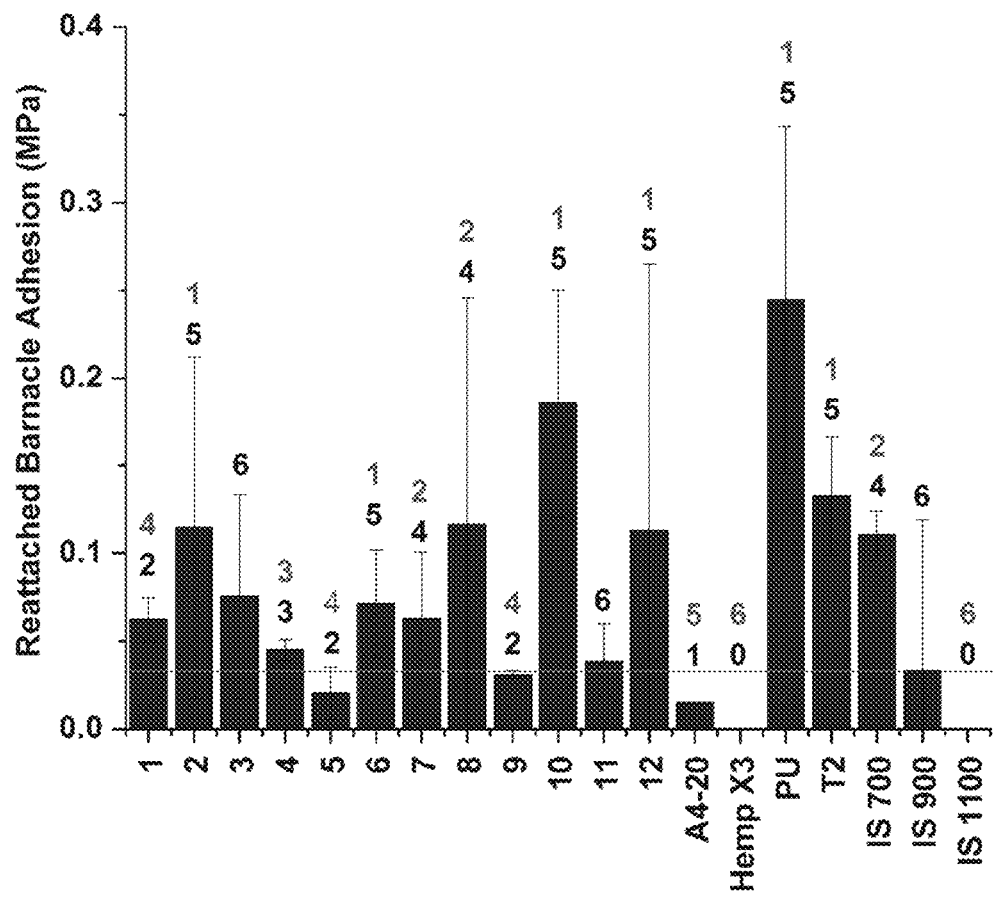
FIG. 7 shows the reattached barnacle (*A. amphitrite*) adhesion strength. Six barnacles were used for each reattachment experiment, out of which red numbers represent the non-attached barnacles and the black numbers represent the successfully reattached barnacles. No broken/damaged barnacles were reported during push off measurements for this experiment. Each bar represents the average adhesion strength based on the number of successfully pushed barnacles and the error bars represent the standard deviation of the mean. Red colored line indicates the average adhesion strength for the IS 900 commercial standard.

Macrofouling organisms such as barnacles contribute to heavy calcareous fouling on ship hulls leading to a significant increase in frictional drag, impairing fuel efficiency.[9] Studies have found that heavy calcareous fouling can increasing power costs by 85%.[3] Therefore, FR properties towards barnacles is important for effective FR coating system. FIG. 7 shows the barnacle adhesion strength for the coatings. All experimental coatings except for coatings 3 and 11 showed non-attached barnacles; some had more than others. Although not as efficient as Hempasil X3 and IS 1100, coatings 1, 4, 5, and 9 had less than 50% of the attempted barnacles attached showing anti-fouling behavior. Also, many experimental coatings (except for 2, 8, 10, and 12) showed very low barnacle adhesion strength comparable to IS 900. The A4-20 internal control displayed excellent FR/AF properties towards barnacles yet relatively behind in diatom removal compared to experimental coatings. Standard PU had the worst FR performance towards barnacles as it showed the highest barnacle adhesion strength. In general, using a combination of DBE-621 and DBE-821 provided a slight edge over just using DBE-821 in terms of FR properties of coatings. It is important to note that having hydrophilic moieties did not impair the FR properties of SiPU coatings as *A. amphitrite* is known to adhere strongly on hydrophilic surfaces.[46]

Figure 8:
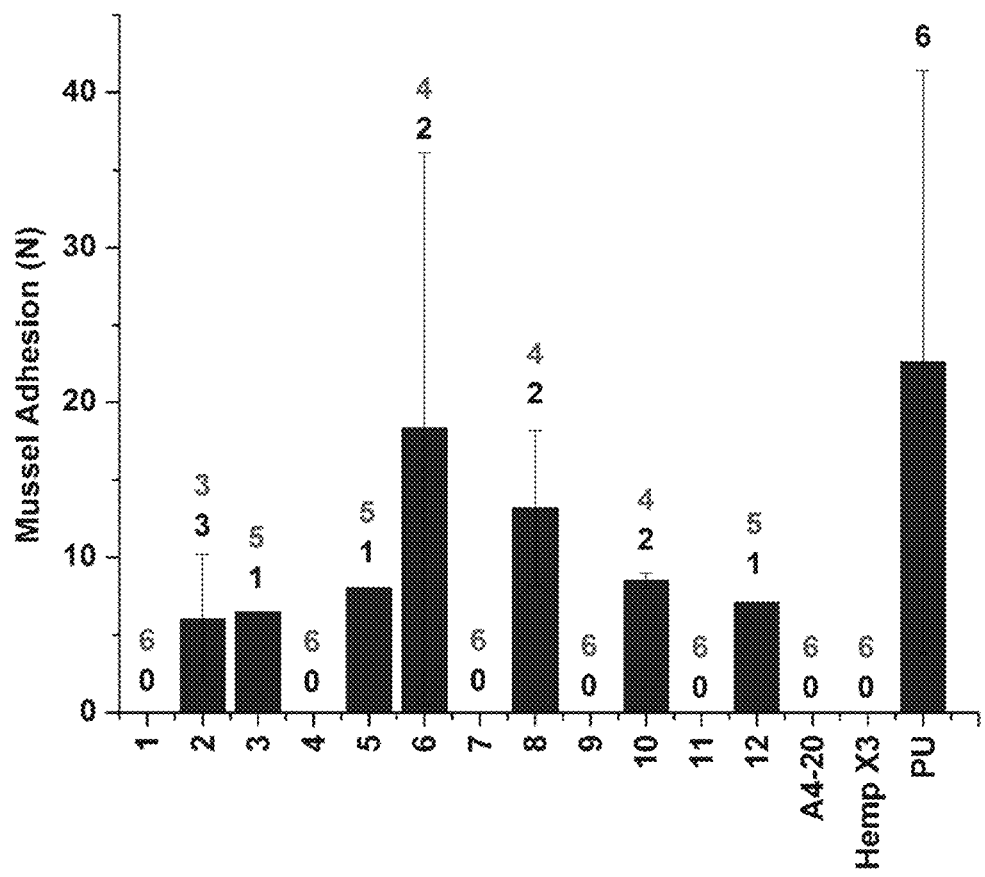
FIG. 8 shows the evaluation of marine mussel (*G. demissa*) adhesion with six attempted attachments for each coating. Each adhesion strength value represents the average force for removal of successfully attached mussels. Error bars represent the standard deviation of the mean. The red number indicates the number of non-attached mussels and the black number indicates the number of attached mussels.

FIG. 8 shows the adhesion of marine mussels to the coatings. Several experimental coatings did not allow any mussel attachments suggesting AF behavior. Among the coatings that had a few mussels attached, mussels were removed with a very small force (most cases <5 N). Coatings 1, 4, 7, 9, and 11 had no mussels attached which was a similar result observed for commercial standard Hempasil X3 and control A4-20. Polyurethane standard showed the highest adhesion of mussels with a removal force >20 N. It is difficult to extrapolate a distinct trend in mussel adhesion in relation to coating composition given that most coatings did not allow mussel settlement.

In general, many hydrophilic side chain modified prepolymer based SiPU coatings displayed comparable FR properties to commercial standards during laboratory biological assays for a variety of marine organisms. Many of the experimental coatings showed >90% biofilm removal and low biomass remaining after water jet treatment. Coatings 9, 10, 11, and 12 showed excellent removal of diatoms on par with leading FR standard Hempasil X3, IS 900, and IS 1100. Many experimental coatings also displayed similar adhesion strength of barnacles comparable to IS 900, although Hempasil X3 and IS 1100 outperformed them during this assay. Mussels did not attach to a number of coatings. The few coatings that did have mussels attached, only allowed a small amount which were easily removed with little force. Coatings 5, 7, 9, and 11 can be regarded as surfaces with broad spectrum FR properties.

CONCLUSIONS

Polyisocyanate resins were modified with hydrophilic side chains and used to prepare poly isocyanate pre-polymers. SiPU coatings were prepared incorporating the polyisocyanate pre-polymers and amphiphilic additives. All experimental coatings displayed surfaces transitioning from hydrophobic to hydrophilic with increasing contact time with water. Coatings with amphiphilic additive combination (DBE-621 and 821) provided coatings that transform to being hydrophilic quickly, whereas using of a single (DBE-821) additive provided a more swiftly changing surface with exposure to water. Side chain combination of PEG-PDMS seemed to provide excellent FR properties for marine bacteria which was on par with commercial FR standards. Excellent FR performance towards diatoms were displayed by coatings prepared only using monofunctional components. Many coating compositions showed improved FR properties compared to that of the A4-20 control considering microfouling. Several experimental coatings also displayed good AF and FR properties towards barnacles and mussels.

REFERENCES

1. Yebra, D. M.; Kiil, S. K.; Dam-Johansen, K., Antifouling Technology—Past, Present and Future Steps Towards Efficientand Environmentally Friendly Antifouling Coatings. *Progress in Organic Coatings* 2004, 50 (2), 75-104.
2. Callow, M. E.; Callow, J. A., Marine Biofouling: A Sticky Problem. *Biologist* 2002, 49 (1), 10.
3. Callow, J. A.; Callow, M. E., Trends in The Development of Environmentally Friendly Fouling-resistant Marine Coatings. *Nat Commun* 2011, 2, 244.
4. Lejars, M.; Margaillan, A.; Bressy, C., Fouling Release Coatings: A Nontoxic Alternative to Biocidal Antifouling Coatings. *Chemical Reviews* 2012, 112 (8), 4347-4390.
5. Nurioglu, A. G.; Esteves, A. C. C.; de With, G., Non-toxic, Non-biocide-release Antifouling Coatings Based on Molecular Structure Design for Marine Applications. *Journal of Materials Chemistry B* 2015, 3 (32), 6547-6570.
6. Tribou, M.; Swain, G., The Use of Proactive In-water Grooming to Improve the Performance of Ship Hull Antifouling Coatings. *Biofouling* 2010, 26 (1), 47-56.
7. Finlay, J. A.; Callow, M. E.; Ista, L. K.; Lopez, G. P.; Callow, J. A., The Influence of Surface Wettability on the Adhesion Strength of Settled Spores of the Green Alga *Enteromorpha* and the Diatom *Amphora*. *Integrative and Comparative Biology* 2002, 42 (6), 1116-1122.
8. Schultz, M. P.; Swain, G. W., The Influence of Biofilms on Skin Friction Drag. *Biofouling* 2000, 15 (1-3), 129-139.
9. Schultz, M. P., Frictional Resistance of Antifouling Coating Systems. *Journal of Fluids Engineering* 2005, 126 (6), 1039-1047.
10. Schultz, M. P.; Bendick, J. A.; Holm, E. R.; Hertel, W. M., Economic Impact of Biofouling on A Naval Surface Ship. *Biofouling* 2010, 27 (1), 87-98.
11. Schultz, M. P.; Walker, J. M.; Steppe, C. N.; Flack, K. A., Impact of Diatomaceous Biofilms on the Frictional Drag of Fouling-release Coatings. *Biofouling* 2015, 31 (9-10), 759-773.
12. Hellio, C.; Yebra, D. M., *Advances in Marine Antifouling Coatings and Technologies*. Woodhead Publishing Limited: Cambridge, UK, 2009.
13. Iguerb, O.; Poleunis, C.; Mazéas, F.; Compere, C.; Bertrand, P., Antifouling Properties of Poly(methyl methacrylate) Films Grafted with Poly(ethylene glycol) Monoacrylate Immersed in Seawater†. *Langmuir* 2008, 24 (21), 12272-12281.
14. Wyszogrodzka, M.; Haag, R., Synthesis and Characterization of Glycerol Dendrons, Self-Assembled Monolayers on Gold: A Detailed Study of Their Protein Resistance. *Biomacromolecules* 2009, 10 (5), 1043-1054.
15. Andrade, J. D.; King, R. N.; Gregonis, D. E.; Coleman, D. L., Surface Characterization of Poly(hydroxyethyl methacrylate) and Related Polymers. I. Contact Angle Methods in Water. *Journal of Polymer Science: Polymer Symposia* 1979, 66 (1), 313-336.
16. Heuberger, M.; Drobek, T.; Spencer, N. D., Interaction Forces and Morphology of a Protein-Resistant Poly(ethylene glycol) Layer. *Biophysical Journal* 2005, 88 (1), 495-504.
17. Jeon, S. I.; Lee, J. H.; Andrade, J. D.; De Gennes, P. G., Protein—Surface Interactions in the Presence of Polyethylene Oxide. *Journal of Colloid and Interface Science* 1991, 142 (1), 149-158.
18. Szleifer, I., Polymers and Proteins: Interactions at Interfaces. *Current Opinion in Solid State and Materials Science* 1997, 2 (3), 337-344.
19. Bowen, J.; Pettitt, M. E.; Kendall, K.; Leggett, G. J.; Preece, J. A.; Callow, M. E.; Callow, J. A., The Influence of Surface Lubricity on the Adhesion of *Navicula perminuta* and *Ulva linza* to Alkanethiol Self-Assembled Monolayers. *Journal of The Royal Society Interface* 2007, 4 (14), 473-477.
20. Prime, K. L.; Whitesides, G. M., Adsorption of Proteins onto Surfaces Containing End-attached Oligo(ethylene 20. oxide): a Model System Using Self-assembled Monolayers. *Journal of the American Chemical Society* 1993, 115 (23), 10714-10721.
21. Jiang, S.; Cao, Z., Ultralow-Fouling, Functionalizable, and Hydrolyzable Zwitterionic Materials and Their Derivatives for Biological Applications. *Advanced Materials* 2010, 22 (9), 920-932.
22. Wu, C.-J.; Huang, C.-J.; Jiang, S.; Sheng, Y.-J.; Tsao, H.-K., Superhydrophilicity and Spontaneous Spreading on Zwitterionic Surfaces: Carboxybetaine and Sulfobetaine. *RSC Advances* 2016, 6 (30), 24827-24834.
23. Bodkhe, R. B.; Stafslien, S. J.; Daniels, J.; Cilz, N.; Muelhberg, A. J.; Thompson, S. E. M.; Callow, M. E.; Callow, J. A.; Webster, D. C., Zwitterionic Siloxane-Polyurethane Fouling-release Coatings. *Progress in Organic Coatings* 2015, 78, 369-380.
24. Coneski, P. N.; Wynne, J. H., Zwitterionic Polyurethane Hydrogels Derived from Carboxybetaine-Functionalized Diols. *ACS Applied Materials & Interfaces* 2012, 4 (9), 4465-4469.
25. Thorlaksen, P. C. W.; Blom, A.; Bork, U. Novel Fouling Control Coating Compositions. US20120264847 A1, 2012.
26. Thorlaksen, P. C. W. Novel Fouling Control Coating Compositions. US20140170426 A1, 2014.
27. Thorlaksen, P. C. W.; Blom, A.; Yebra, D. M. Fouling Control Coating Compositions. US20140135422 A1, 2014.
28. Ekin, A.; Webster, D. C., Combinatorial and High-Throughput Screening of the Effect of Siloxane Composition on the Surface Properties of Crosslinked Siloxane-Polyurethane Coatings. *Journal of Combinatorial Chemistry* 2006, 9 (1), 178-188.
29. Webster, D. C.; Pieper, R. J.; Ekin, A. Thermoset Siloxane-Urethane Fouling Release Coatings. U.S. Pat. No. 7,989,074 B2, 2011.
30. Sommer, S.; Ekin, A.; Webster, D. C.; Stafslien, S. J.; Daniels, J.; VanderWal, L. J.; Thompson, S. E. M.; Callow, M. E.; Callow, J. A., A Preliminary Study on the Properties and Fouling-release Performance of Siloxane-Polyurethane coatings Prepared from PDMS Macromers. *Biofouling* 2010, 26 (8), 961-972.
31. Sommer, S. A.; Joseph, B. R.; Fischer, H. D.; Bodkhe, R. B.; Staflien, S. J.; Daniels, J.; Yehle, C.; Webster, D. C., Effect of Pigmentation on Siloxane-Polyurethane Coatings. *Journal of Coatings Technology Research* 2011, 8 (6), 661-670.
32. Bodkhe, R. B.; Stafslien, S. J.; Cilz, N.; Daniels, J.; Thompson, S. E. M.; Callow, M. E.; Callow, J. A.; Webster, D. C., Polyurethanes with Amphiphilic Surfaces Made Using Telechelic Functional PDMS Having Orthogonal Acid Functional Groups. *Progress in Organic Coatings* 2012, 75 (1-2), 38-48.
33. Bodkhe, R. B.; Thompson, S. E. M.; Yehle, C.; Cilz, N.; Daniels, J.; Stafslien, S. J.; Callow, M. E.; Callow, J. A.; Webster, D. C., The Effect of Formulation Variables on Fouling-release Performance of Stratified Siloxane-Polyurethane Coatings. *Journal of Coatings Technology Research* 2012, 9 (3), 235-249.
34. Webster, D. C.; Bodkhe, R. B. Functionalized Silicones with Polyalkylene Oxide Side Chains. U.S. Pat. No. 9,169,359 B2, 2015, 2015.
35. Stafslien, S. J.; Bahr, J. A.; Daniels, J. W.; Wal, L. V.; Nevins, J.; Smith, J.; Schiele, K.; Chisholm, B., Combinatorial Materials Research Applied to the Development of New Surface Coatings VI: An Automated Spinning Water Jet Apparatus for the High-Throughput Characterization of Fouling-release Marine Coatings. *Review of Scientific Instruments* 2007, 78 (7), 072204.
36. Callow, M. E.; Callow, J. A.; Conlan, S.; Clare, A. S.; Stafslien, S., Efficacy Testing of Nonbiocidal and Fouling-release Coatings. In *Biofouling Methods*, John Wiley & Sons, Ltd: 2014; pp 291-316.
37. Stafslien, S.; Daniels, J.; Mayo, B.; Christianson, D.; Chisholm, B.; Ekin, A.; Webster, D.; Swain, G., Combinatorial Materials Research Applied to the Development of New Surface Coatings. IV: A High-Throughput Bacterial Retention and Retraction Assay for Screening Fouling-release Performance of Coatings. *Biofouling* 2007, 23 (1), 45-54.
38. Casse, F.; Ribeiro, E.; Ekin, A.; Webster, D. C.; Callow, J. A.; Callow, M. E., Laboratory Screening of Coating Libraries for Algal Adhesion. *Biofouling* 2007, 23 (3/4), 267-276.
39. Cassé, F.; Stafslien, S. J.; Bahr, J. A.; Daniels, J.; Finlay, J. A.; Callow, J. A.; Callow, M. E., Combinatorial Materials Research Applied to the Development of New Surface Coatings V. Application of a Spinning Water-jet for the Semi-high Throughput Assessment of the Attachment Strength of Marine Fouling Algae. *Biofouling* 2007, 23 (2), 121-130.
40. Stafslien, S.; Daniels, J.; Bahr, J.; Chisholm, B.; Ekin, A.; Webster, D.; Orihuela, B.; Rittschof, D., An Improved Laboratory Reattachment Method for the Rapid Assessment of Adult Barnacle Adhesion Strength to Fouling-release Marine Coatings. *Journal of Coatings Technology and Research* 2012, 9 (6), 651-665.
41. Rittschof, D.; Orihuela, B.; Stafslien, S.; Daniels, J.; Christianson, D.; Chisholm, B.; Holm, E., Barnacle Reattachment: A Tool for Studying Barnacle Adhesion. *Biofouling* 2008, 24 (1), 1-9.
42. Emily, C. B.; John, M. G., Strategies for Life in Flow: Tenacity, Morphometry, and Probability of Dislodgment of Two Mytilus Species. *Marine Ecology Progress Series* 1997, 159, 197-208.
43. Burkett, J. R.; Wojtas, J. L.; Cloud, J. L.; Wilker, J. J., A Method for Measuring the Adhesion Strength of Marine Mussels. *The Journal of Adhesion* 2009, 85 (9), 601-615.
44. Crisp, D. J.; Walker, G.; Young, G. A.; Yule, A. B., Adhesion and Substrate Choice in Mussels and Barnacles. *Journal of Colloid and Interface Science* 1985, 104 (1), 40-50.
45. Holland, R.; Dugdale, T. M.; Wetherbee, R.; Brennan, A. B.; Finlay, J. A.; Callow, J. A.; Callow, M. E., Adhesion and Motility of Fouling Diatoms on A Silicone Elastomer. *Biofouling* 2004, 20 (6), 323-329.
46. Aldred, N.; Scardino, A.; Cavaco, A.; de Nys, R.; Clare, A. S., Attachment Strength is A Key Factor in the Selection of Surfaces by Barnacle Cyprids (Balanus Amphitrite) During Settlement. *Biofouling* 2010, 26 (3), 287-299.

The claimed invention is:

1. A curable amphiphilic siloxane polyurethane coating composition comprising:
   a) at least one pre-polymer selected from the group consisting of:
      a2) a pre-polymer comprising:
         a2.1) at least one hydrophilically modified polyisocyanate comprising the reaction product of:
            a2.1.1) a polyisocyanate based on hexamethylene diisocyanate (HMDI) modified with a polyethylene glycol (PEG) and at least one sulfobetaine group; and a2.1.2) at least one further PEG and/or at least one poly(dimethyl siloxane) (PDMS);
a3) a pre-polymer comprising:
a3.1) at least one hydrophilically modified polyisocyanate comprising the reaction product of:
a3.1.1) a polyisocyanate based on HMDI modified with a PEG; and
a3.1.2) at least one further PEG and/or at least one PDMS;
a3.2) at least one further PEG;
a3.3) at least one difunctional hydroxyalkyl terminated PDMS; and
a3.4) a sulfobetaine-modified polyisocyanate comprising the reaction product of at least one sulfobetaine group and a polyisocyanate based on isophorone diisocyanate (IPDI), or a PEG-modified polyisocyanate comprising the reaction product of at least one PEG and IPDI; and
a4) a pre-polymer comprising:
a4.1) at least one hydrophilically modified polyisocyanate comprising the reaction product of:
a4.1.1) a polyisocyanate based on HMDI modified with a PEG and at least one sulfobetaine group; and
a4.1.2) at least one further PEG and/or at least one PDMS;
a4.2) at least one further PEG;
a4.3) at least one difunctional hydroxyalkyl terminated PDMS; and
a4.4) a sulfobetaine-modified polyisocyanate comprising the reaction product of at least one sulfobetaine group and a polyisocyanate based on IPDI, or a PEG-modified polyisocyanate comprising the reaction product of at least one PEG and IPDI;
b) at least one polyol;
c) at least one polyisocyanate;
d) at least one PEG modified siloxane amphiphilic additive;
e) optionally, at least one catalyst;
f) optionally, at least one solvent; and
g) optionally, at least one pot-life extender.

2. The curable amphiphilic siloxane polyurethane coating composition of claim 1, wherein the at least one polyol, b), is selected from the group consisting of at least one acrylic polyol, polyester polyol, polycarbonate polyol, polyether polyol, or mixtures thereof.

3. The curable amphiphilic siloxane polyurethane coating composition of claim 2, wherein the at least one polyol, b), is an acrylic polyol.

4. The curable amphiphilic siloxane polyurethane coating composition of claim 3, wherein the acrylic polyol is composed of 80% butyl acrylate and 20% 2-hydroxyethyl acrylate.

5. The curable amphiphilic siloxane polyurethane coating composition of claim 1, wherein the at least one polyisocyanate, c), is a polyisocyanate based on IPDI.

6. A cured amphiphilic siloxane polyurethane coating composition of claim 1.

7. An object coated with the curable amphiphilic siloxane polyurethane coating composition of claim 1.

8. A method for reducing or preventing biofouling of a surface exposed to an aqueous environment comprising the steps of:
coating the surface with the curable amphiphilic siloxane polyurethane coating composition of claim 1 to form a coated surface, and
curing the amphiphilic siloxane polyurethane coating composition on the coated surface.

9. A marine fouling-release coating having the curable amphiphilic siloxane polyurethane coating composition of claim 1.

10. A method of making the curable amphiphilic siloxane polyurethane coating composition of claim 1, comprising: reacting the at least one pre-polymer, a), with the at least one polyol, b), the at least one polyisocyanate, c), the at least one amphiphilic additive, d), optionally the at least one catalyst, e), optionally the at least one solvent, f), and optionally the at least one pot-life extender, g).

11. The curable amphiphilic siloxane polyurethane coating composition of claim 1, wherein the at least one pre-polymer a) further comprises a pre-polymer a1), wherein the pre-polymer a1) comprises:
a1.1) at least one hydrophilically modified polyisocyanate comprising the reaction product of:
a1.1.1) a polyisocyanate based on HMDI modified with a PEG; and
a1.1.2) at least one further PEG and at least one PDMS.

12. The curable amphiphilic siloxane polyurethane coating composition of claim 1, wherein
a) the at least one pre-polymer is selected from:
a2) the pre-polymer comprising:
a2.1) at least one hydrophilically modified polyisocyanate comprising the reaction product of:
a2.1.1) a polyisocyanate based on HMDI modified with a PEG and at least one sulfobetaine group; and
a2.1.2) at least one further PEG and/or at least one PDMS.

13. The curable amphiphilic siloxane polyurethane coating composition of claim 1, wherein
a) the at least one pre-polymer is selected from:
a3) the pre-polymer comprising:
a3.1) at least one hydrophilically modified polyisocyanate comprising the reaction product of:
a3.1.1) a polyisocyanate based on HMDI modified with a PEG; and
a3.1.2) at least one further PEG and/or at least one PDMS;
a3.2) at least one further PEG;
a3.3) at least one difunctional hydroxyalkyl terminated PDMS; and
a3.4) a sulfobetaine-modified polyisocyanate comprising the reaction product of at least one sulfobetaine group and a polyisocyanate based on IPDI, or a PEG-modified polyisocyanate comprising the reaction product of at least one PEG and IPDI.

14. The curable amphiphilic siloxane polyurethane coating composition of claim 1, wherein
a) the at least one pre-polymer is selected from:
a4) the pre-polymer comprising:
a4.1) at least one hydrophilically modified polyisocyanate comprising the reaction product of:
a4.1.1) a polyisocyanate based on HMDI modified with a PEG and at least one sulfobetaine group; and
a4.1.2) at least one further PEG and/or at least one PDMS;
a4.2) at least one further PEG;
a4.3) at least one difunctional hydroxyalkyl terminated PDMS; and
a4.4) a sulfobetaine-modified polyisocyanate comprising the reaction product of at least one sulfobetaine group and a polyisocyanate based on IPDI, or a PEG-modified polyisocyanate comprising the reaction product of at least one PEG and IPDI.

15. The curable amphiphilic siloxane polyurethane coating composition of claim 11, wherein:
   b) the at least one polyol is selected from at least one acrylic polyol; and
   c) the at least one polyisocyanate is a polyisocyanate based on IPDI.

16. The curable amphiphilic siloxane polyurethane coating composition of claim 12, wherein:
   b) the at least one polyol is selected from at least one acrylic polyol; and
   c) the at least one polyisocyanate is a polyisocyanate based on IPDI.

17. The curable amphiphilic siloxane polyurethane coating composition of claim 13, wherein:
   b) the at least one polyol is selected from at least one acrylic polyol; and
   c) the at least one polyisocyanate is a polyisocyanate based on IPDI.

18. The curable amphiphilic siloxane polyurethane coating composition of claim 14, wherein:
   b) the at least one polyol is selected from at least one acrylic polyol; and
   c) the at least one polyisocyanate is a polyisocyanate based on IPDI.

19. The curable amphiphilic siloxane polyurethane coating composition of claim 1, wherein the at least one PEG modified siloxane amphiphilic additive is selected from a dimethylsiloxane.

* * * * *